United States Patent
Morisue

(10) Patent No.: US 7,489,822 B2
(45) Date of Patent: Feb. 10, 2009

(54) IMAGE PROCESSING APPARATUS AND METHOD FOR DETECTING A DIRECTION OF AN EDGE IN THE VICINITY OF A PIXEL OF INTEREST AND GENERATING ALL COLOR SIGNALS FOR EACH PIXEL BY INTERPOLATION USING COLOR SIGNALS OF A PIXEL OF INTEREST AND ITS NEIGHBOR PIXELS, AND A RECORDING MEDIUM HAVING A PROGRAM RECORDED THEREON FOR CAUSING THE APPARATUS TO PERFORM THE METHOD

(75) Inventor: Takashi Morisue, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 558 days.

(21) Appl. No.: 11/097,416

(22) Filed: Mar. 31, 2005

(65) Prior Publication Data

US 2005/0220350 A1    Oct. 6, 2005

(30) Foreign Application Priority Data

Mar. 31, 2004    (JP)    ............................. 2004-107954

(51) Int. Cl.
*G06K 9/48* (2006.01)
*G06K 9/00* (2006.01)

(52) U.S. Cl. ..................... 382/199; 382/165; 382/190

(58) Field of Classification Search ................ 382/162, 382/165, 181, 190, 195, 199
See application file for complete search history.

(56) References Cited

U.S. PATENT DOCUMENTS

| | | | | |
|---|---|---|---|---|
| 5,373,322 A | * | 12/1994 | Laroche et al. | ............. 348/273 |
| 6,507,364 B1 | * | 1/2003 | Bishay et al. | ................ 348/242 |
| 6,563,537 B1 | | 5/2003 | Kawamura et al. | |
| 6,798,422 B2 | * | 9/2004 | Wang | ........................ 345/611 |
| 7,053,944 B1 | * | 5/2006 | Acharya et al. | ............. 348/273 |
| 7,333,678 B1 | * | 2/2008 | Huang et al. | ................ 382/300 |

FOREIGN PATENT DOCUMENTS

| | | |
|---|---|---|
| JP | 10-164602 | 6/1998 |
| JP | 11-103466 | 4/1999 |
| JP | 11-122626 | 4/1999 |
| JP | 2000-165892 | 6/2000 |
| JP | 2001-338285 | 12/2001 |
| JP | 2003-110856 | 4/2003 |
| JP | 2003-143615 | 5/2003 |

* cited by examiner

*Primary Examiner*—Brian Q Le
(74) *Attorney, Agent, or Firm*—Edwards Angell Palmer & Dodge LLP; David G. Conlin; David A. Tucker

(57) ABSTRACT

An image processing apparatus comprises a first color signal detection section of detecting a first color signal indicating a color component of a pixel of interest from the pixel of interest, a second color signal detection section of detecting a plurality of second color signals indicating color components of a plurality of neighbor pixels located in a vicinity of the pixel of interest from the plurality of neighbor pixels, and a direction detection section of detecting a direction of an edge in the vicinity of the pixel of interest based on the first color signal and the plurality of second color signals. The color components of the plurality of neighbor pixels include at least three color components.

14 Claims, 14 Drawing Sheets

(a) Right-inclined  (b) Horizontal  (c) Left-inclined  (d) Vertical

FIG. 8A

| V11 | V21 | V31 | V41 | V51 |
|-----|-----|-----|-----|-----|
| V12 | V22 | V32 | V42 | V52 |
| V13 | V23 | V33 | V43 | V53 |
| V14 | V24 | V34 | V44 | V54 |
| V15 | V25 | V35 | V45 | V55 |

FIG. 8B

| V11 | V21 | V31 | V41 | V51 |
|-----|-----|-----|-----|-----|
| V12 | V22 | V32 | V42 | V52 |
| V13 | V23 | V33 | V43 | V53 |
| V14 | V24 | V34 | V44 | V54 |
| V15 | V25 | V35 | V45 | V55 |

FIG. 8C

| V11 | V21 | V31 | V41 | V51 |
|-----|-----|-----|-----|-----|
| V12 | V22 | V32 | V42 | V52 |
| V13 | V23 | V33 | V43 | V53 |
| V14 | V24 | V34 | V44 | V54 |
| V15 | V25 | V35 | V45 | V55 |

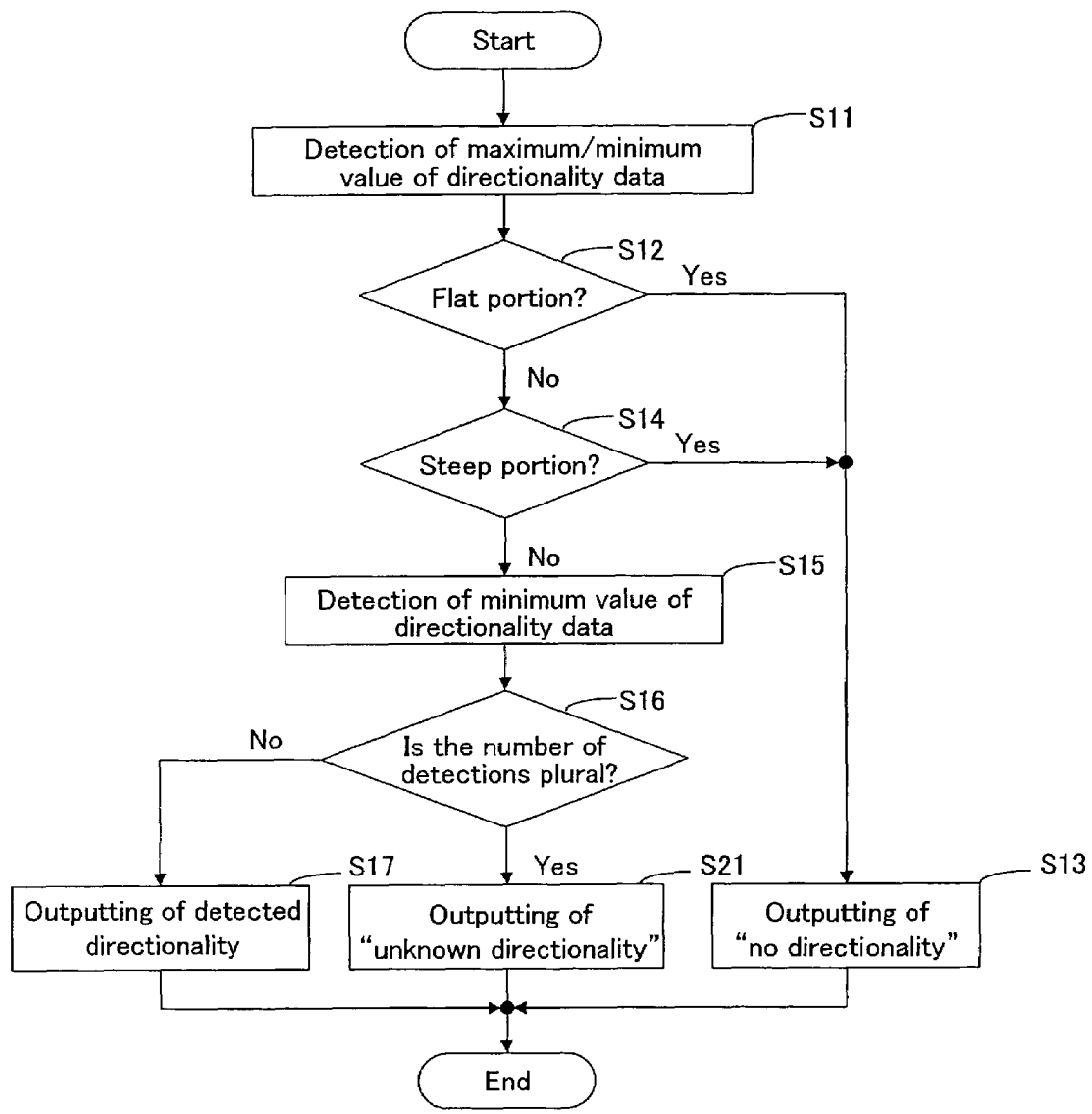

FIG. 15  PRIOR ART

| G | B | G | B | G |
|---|---|---|---|---|
| R | G | R | G | R |
| G | B | G | B | G |
| R | G | R | G | R |
| G | B | G | B | G |

FIG. 16A PRIOR ART

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

Pixel of interest: G33
(color element: G)

FIG. 16B PRIOR ART

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

Pixel of interest: P33
(color element: R or B)

FIG. 16C PRIOR ART

| V11 | V21 | V31 | V41 | V51 |
|---|---|---|---|---|
| V12 | V22 | V32 | V42 | V52 |
| V13 | V23 | V33 | V43 | V53 |
| V14 | V24 | V34 | V44 | V54 |
| V15 | V25 | V35 | V45 | V55 |

Pixel of interest: V33
(color element: any)

200

IMAGE PROCESSING APPARATUS AND METHOD FOR DETECTING A DIRECTION OF AN EDGE IN THE VICINITY OF A PIXEL OF INTEREST AND GENERATING ALL COLOR SIGNALS FOR EACH PIXEL BY INTERPOLATION USING COLOR SIGNALS OF A PIXEL OF INTEREST AND ITS NEIGHBOR PIXELS, AND A RECORDING MEDIUM HAVING A PROGRAM RECORDED THEREON FOR CAUSING THE APPARATUS TO PERFORM THE METHOD

This non-provisional application claims priority under 35 U.S.C. §119(a) on Patent Application No. 2004-107954 filed in Japan on Mar. 31, 2004, the entire contents of which are hereby incorporated by reference.

BACKGROUND OF THE INVENTION

1. Field of the Invention

The present invention relates to an image processing apparatus, an image processing method and an image processing program which can detect a direction of an edge in the vicinity of a pixel of interest based on a number of color components, and a recording medium recording the image processing program.

For example, the present invention relates to an imaging apparatus, such as a digital camera, a camcorder, a mobile telephone with camera or the like, which employs a single solid-state imaging device, such as a CCD, a CMOS or the like. More particularly, the present invention relates to an image processing apparatus, an image processing method and an image processing program which generate all color signals for each pixel by interpolation using color signals of a pixel of interest and its neighbor pixels based on color signals output from a solid-state imaging device in which a plurality of color filters are individually disposed on respective pixels. The present invention also relates to a recording medium recording the image processing program.

2. Description of the Related Art

In general, solid-state imaging devices (e.g., a CCD and a CMOS for use in digital cameras or camcorders) detect only information indicating the brightness of light. Therefore, in order for a camera having a single solid-state imaging device (e.g., CCD) to obtain color information, pixels contained in the CCD are individually covered with respective color filters each of which passes only one color component, so that each pixel outputs a corresponding color component during operation. When the color filters are primary color filters, there are three color components: red (R), green (G) and blue (B), for example.

Several types of arrangement of color components of a color filter have been proposed.

Figure 15:
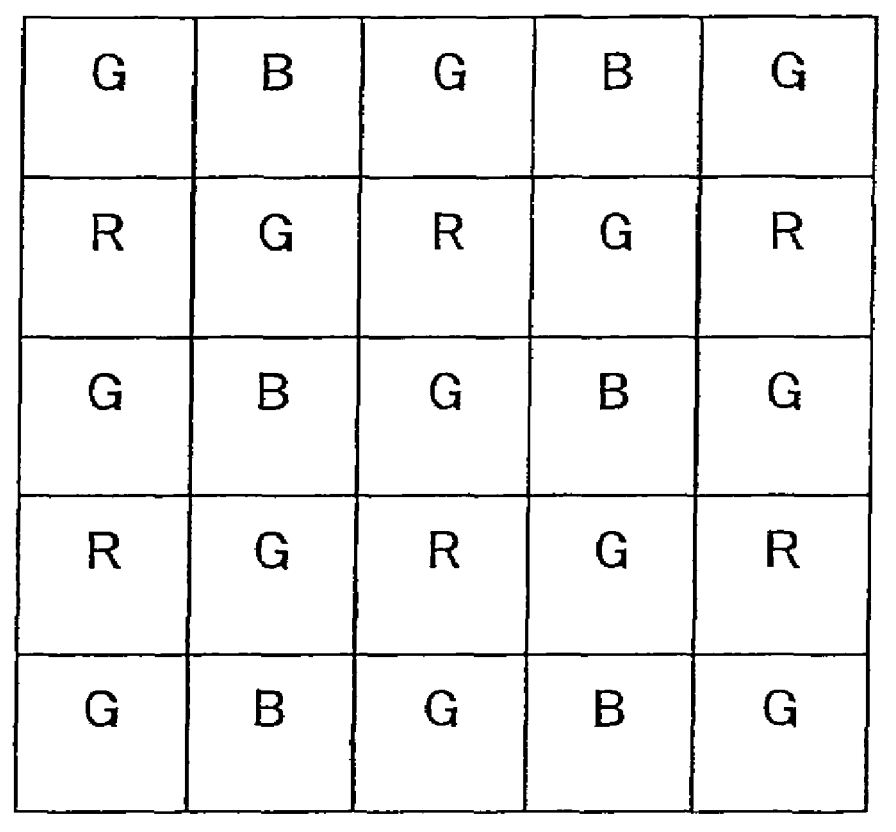

FIG. 15 shows a Bayer arrangement, where a checkerboard array of G pixels which contribute to a large proportion of a brightness signal is patterned, and half of the remaining spaces are then provided with R pixels and the remainder with B pixels. At a time when a signal is output from a CCD covered with the Bayer arrangement color filter, information about only one color of the RGB color components is obtained from each pixel.

Therefore, an image processing section estimates information about the remaining two colors for each pixel by interpolation using color signal values of its surrounding pixels. Further, the one-color information obtained by the CCD for each pixel is also subjected to interpolation using color signal values of the pixel of interest and its surrounding pixels.

FIGS. 16A to 16C show Bayer arrangements in which a pixel of interest has a color component of G, R or B.

FIG. 16A shows a Bayer arrangement in which a pixel of interest has a color component of G. FIG. 16B shows a Bayer arrangement in which a pixel of interest has a color component of R or B. FIG. 16C shows a Bayer arrangement in which a pixel of interest has an arbitrary color component.

In FIGS. 16A and 16B, symbols P and Q indicate respectively the color component R and the color component B, or the color component B and the color component R. When the symbol P indicates the color component R, the symbol Q indicates the color component B. Conversely, when the symbol P indicates the color component B, the symbol Q indicates the color component R.

An interpolation expression (Expression 1) according to a bilinear method where a color filter has the Bayer arrangement will be described as follows.

(Expression 1)

When the pixel of interest is G33 (see FIG. 16A), $Go=G33$ or $Go=(G33*4+G22+G42+G24+G44)/8$, $Po=(P32+P34)/2$, and $Qo=(Q23+Q43)/2$.

When the pixel of interest is P33 (see FIG. 16B), $Go=(G32+G23+G43+G34)/4$, $Po=P33$, and $Qo=(Q22+Q42+Q24+Q44)/4$, Go: output G signal of the pixel of interest,
Po: output P signal of the pixel of interest,
Qo: output Q signal of the pixel of interest, and note that (P, Q)=(R, B) or (B, R).

Since the bilinear method is a kind of lowpass process, it is advantageous that noise is caused not to be noticeable. However, a high frequency component in spatial frequencies of an object, such as an edge of the object or the like, is lost, disadvantageously leading to a reduction in resolution.

Therefore, a technique of performing interpolation by investigating correlation in signal value between a pixel of interest and its neighbor pixels using image data having the Bayer arrangement, has been proposed (e.g., Japanese Laid-Open Publication No. 10-164602 (Patent Publication 1), Japanese Laid-Open Publication No. 11-122626 (Patent Publication 2), Japanese Laid-Open Publication No. 2000-165892 (Patent Publication 3), and Japanese Laid-Open Publication No. 2003-143615 (Patent Publication 4)). In this interpolation process, the presence or absence of an edge in the vicinity of the pixel of interest and a directionality of the edge are detected, a color signal of a pixel having a high level of correlation in the detected edge direction is given a greater weight in order to prevent loss of a high frequency component indicating an edge in the image data.

[Patent Publication 1] Japanese Laid-Open Publication No. 10-164602
[Patent Publication 2] Japanese Laid-Open Publication No. 11-122626
[Patent Publication 3] Japanese Laid-Open Publication No. 2000-165892
[Patent Publication 4] Japanese Laid-Open Publication No. 2003-143615

However, in the techniques disclosed in Patent Publication 1, Patent Publication 2 and Patent Publication 3, whereas G pixels the number of which is largest in the RGB color components and which contribute to a large proportion of a brightness signal are used in edge detection, R pixels and B pixels which share half of image data are not used. Therefore, when image data has less G components, the accuracy of edge detection is deteriorated.

On the other hand, in the technique disclosed in Patent Publication 4, when the color element of a pixel of interest is an R pixel, a G pixel and an R pixel are used for edge detection. When the color element of a pixel of interest is a B pixel, a G pixel and a B pixel are used for edge detection. However, when the color element of a pixel of interest is a G pixel, only a G pixel is used. Therefore, when image data has a less number of G components, the accuracy of edge detection is deteriorated.

Further, in the techniques disclosed in Patent Publications 1 to 4, when image data contains noise, an influence of the noise may lead to an error in edge detection.

SUMMARY OF THE INVENTION

According to an aspect of the present invention, an image processing apparatus comprises a first color signal detection section of detecting a first color signal indicating a color component of a pixel of interest from the pixel of interest, a second color signal detection section of detecting a plurality of second color signals indicating color components of a plurality of neighbor pixels located in a vicinity of the pixel of interest from the plurality of neighbor pixels, and a direction detection section of detecting a direction of an edge in the vicinity of the pixel of interest based on the first color signal and the plurality of second color signals. The color components of the plurality of neighbor pixels include at least three color components.

In one embodiment of this invention, the direction detection section includes a detection section of detecting directionality data based on the first color signal and the plurality of second color signals, and a directionality data direction detection section of detecting at least one edge direction among a plurality of edge directions, depending on a size of a value indicated by the directionality data. The directionality data indicates a value corresponding to a degree of a similarity between a designated edge direction among the plurality of edge directions and a predetermined edge direction in the vicinity of the pixel of interest.

In one embodiment of this invention, the image processing apparatus further includes a directionality storage section of storing data indicating the direction of the edge in the vicinity of the pixel of interest. The directionality data direction detection section further includes an adjoining pixel directionality referencing section of referencing an edge direction of a pixel adjoining the pixel of interest.

In one embodiment of this invention, the directionality data direction detection section further includes a section of detecting an edge direction of a pixel adjoining the pixel of interest, and a section of referencing the detected edge direction of the adjoining pixel.

In one embodiment of this invention, the image processing apparatus further includes a plurality of interpolation filters of interpolating data indicating the plurality of edge directions. The direction detection section further includes a determination section of determining whether or not there is an edge in the vicinity of the pixel of interest based on data indicating the direction of the edge in the vicinity of the pixel of interest. When it is determined that there is an edge in the vicinity of the pixel of interest, at least one of the plurality of interpolation filters interpolates the data indicating the detected edge direction in the vicinity of the pixel of interest.

In one embodiment of this invention, the image processing apparatus further includes a plurality of interpolation filters of interpolating data when there is not an edge in the vicinity of the pixel of interest. The direction detection section includes a determination section of determining whether or not there is an edge in the vicinity of the pixel of interest based on data indicating the direction of the edge in the vicinity of the pixel of interest. When it is determined that there is not an edge in the vicinity of the pixel of interest, at least one of the plurality of interpolation filters interpolates data when there is not an edge in the vicinity of the pixel of interest.

In one embodiment of this invention, the direction detection section includes a section of detecting edge directions of a plurality of pixels contained in a designated region, and an image processing section of interpolating the plurality of pixels based on data indicating the edge directions of the plurality of pixels.

In one embodiment of this invention, the direction detection section further includes a directionality correction section of correcting the edge directions of the plurality of pixels based on the edge direction of the pixel of interest and the edge directions of the neighbor pixels.

According to another aspect of the present invention, an image processing method comprises detecting a first color signal indicating a color component of a pixel of interest from the pixel of interest, detecting a plurality of second color signals indicating color components of a plurality of neighbor pixels located in a vicinity of the pixel of interest from the plurality of neighbor pixels, and detecting a direction of an edge in the vicinity of the pixel of interest based on the first color signal and the plurality of second color signals. The color components of the plurality of neighbor pixels include at least three color components.

In one embodiment of this invention, detecting the direction of the edge in the vicinity of the pixel of interest includes detecting directionality data based on the first color signal and the plurality of second color signals, and detecting at least one edge direction among a plurality of edge directions, depending on a size of a value indicated by the directionality data. The directionality data indicates a value corresponding to a degree of a similarity between a designated edge direction among the plurality of edge directions and a predetermined edge direction in the vicinity of the pixel of interest.

In one embodiment of this invention, the image processing method further includes storing data indicating the direction of the edge in the vicinity of the pixel of interest. Detecting the at least one edge direction further includes referencing an edge direction of a pixel adjoining the pixel of interest.

In one embodiment of this invention, detecting the at least one edge direction further includes detecting an edge direction of a pixel adjoining the pixel of interest, and referencing the detected edge direction of the adjoining pixel.

In one embodiment of this invention, the image processing method further includes interpolating data indicating the plurality of edge directions. Detecting the direction of the edge in the vicinity of the pixel of interest further includes determining whether or not there is an edge in the vicinity of the pixel of interest based on data indicating the direction of the edge in the vicinity of the pixel of interest. When it is determined that there is an edge in the vicinity of the pixel of interest, interpolating the data interpolates the data indicating the detected edge direction in the vicinity of the pixel of interest.

In one embodiment of this invention, the image processing method further includes interpolating data when there is not an edge in the vicinity of the pixel of interest. Detecting the direction of the edge in the vicinity of the pixel of interest includes determining whether or not there is an edge in the vicinity of the pixel of interest based on data indicating the direction of the edge in the vicinity of the pixel of interest. When it is determined that there is not an edge in the vicinity of the pixel of interest, interpolating the data interpolates data when there is not an edge in the vicinity of the pixel of interest.

In one embodiment of this invention, detecting the direction of the edge in the vicinity of the pixel of interest includes detecting edge directions of a plurality of pixels contained in a designated region, and interpolating the plurality of pixels based on data indicating the edge directions of the plurality of pixels.

In one embodiment of this invention, detecting the direction of the edge in the vicinity of the pixel of interest further includes correcting the edge directions of the plurality of pixels based on the edge direction of the pixel of interest and the edge directions of the neighbor pixels.

According to another aspect of the present invention, a program for causing an image processing apparatus comprising a control section of controlling an image processing section to execute image processing, comprises detecting a first color signal indicating a color component of a pixel of interest from the pixel of interest, detecting a plurality of second color signals indicating color components of a plurality of neighbor pixels located in a vicinity of the pixel of interest from the plurality of neighbor pixels, and detecting a direction of an edge in the vicinity of the pixel of interest based on the first color signal and the plurality of second color signals. The color components of the plurality of neighbor pixels include at least three color components.

In one embodiment of this invention, a recording medium is provided which can be read by an image processing apparatus comprising a control section of controlling an image processing section, and records a program which causes the image processing apparatus to execute a program. The program comprises detecting a first color signal indicating a color component of a pixel of interest from the pixel of interest, detecting a plurality of second color signals indicating color components of a plurality of neighbor pixels located in a vicinity of the pixel of interest from the plurality of neighbor pixels, and detecting a direction of an edge in the vicinity of the pixel of interest based on the first color signal and the plurality of second color signals. The color components of the plurality of neighbor pixels include at least three color components.

According to the present invention, a direction of an edge in the vicinity of a pixel of interest is detected based on a first color signal indicating a color component of a pixel of interest and a second color signal indicating color components of a plurality of neighbor pixels. The color components of the neighbor pixels include at least three color components. Therefore, as compared to when a direction of an edge in the vicinity of a pixel of interest is detected based on a color signal indicating two or less color component colors among the first color signal and the color components of the neighbor pixels, the direction of the edge in the vicinity of the pixel of interest can be detected based on a color signal indicating a large number of color components. As a result, a direction of an edge in the vicinity of a pixel of interest can be detected with higher accuracy.

According to the present invention, it is possible to provide an image processing apparatus, an image processing method and an image processing program which can detect and store an edge of an object using interpolation with high accuracy, and a recording medium storing the image processing program.

Thus, the invention described herein makes possible the advantages of providing an image processing apparatus, an image processing method and an image processing program which can detect an edge of an object with high accuracy using interpolation, and a recording medium storing the image processing program.

These and other advantages of the present invention will become apparent to those skilled in the art upon reading and understanding the following detailed description with reference to the accompanying figures.

BRIEF DESCRIPTION OF THE DRAWINGS

FIGS. 8A to 8C show examples of referenced pixels.

FIG. 9 shows a procedure of directionality separate detection in step S19.

FIG. 15 shows a Bayer arrangement.

FIGS. 16A to 16C show Bayer arrangements in which a pixel of interest has a color component of G, R or B.

DESCRIPTION OF THE PREFERRED EMBODIMENTS

Hereinafter, the present invention will be described by way of illustrative examples with reference to the accompanying drawings.

EXAMPLE 1

Figure 1:
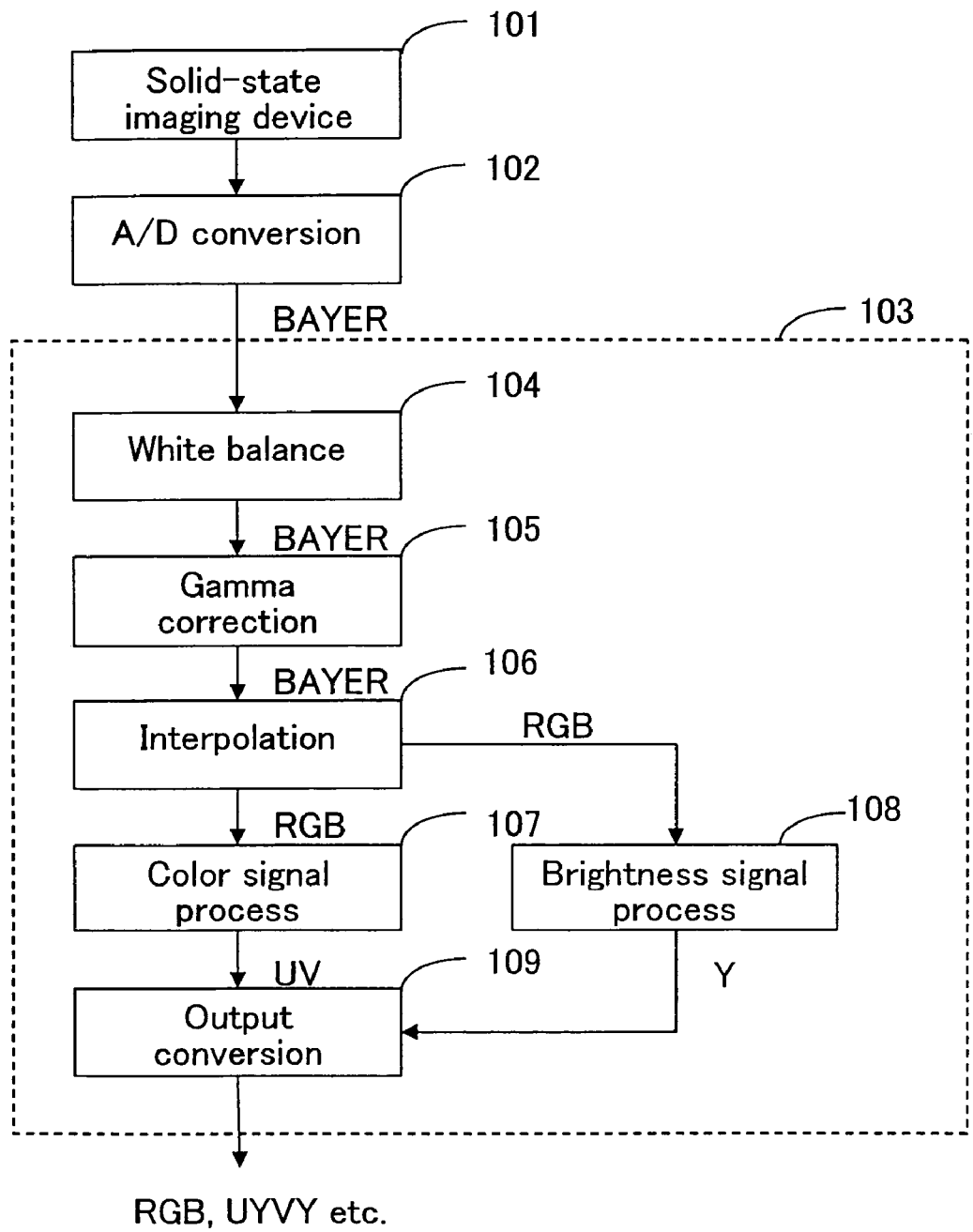
FIG. 1 is a diagram showing an image processing apparatus according to Example 1 of the present invention.

FIG. 1 shows an image processing apparatus 100 according to Example 1 of the present invention.

The image processing apparatus 100 comprises a solid-state imaging device 101, an A/D (analog/digital) converter 102, and an image processing section 103.

The solid-state imaging device 101, the A/D converter 102 and the image processing section 103 detect a color signal indicating a color component of a pixel of interest from the pixel of interest, and a plurality of color signals indicating color components of a plurality of neighbor pixels located in the vicinity of the pixel of interest from the plurality of neighbor pixels. Here, the color components of the neighbor pixels include at least three color components. The three color components are, for example, a color component R, a color component G and a color component B which indicate three primary colors. Hereinafter, the three color components are assumed to be the color component R, the color component G and the color component B. However, the three color components are not limited to the above-described three primary colors, as long as at least three color components are color components indicating primary colors which are required to exhibit all colors. A color component Y (yellow), a color component M (magenta) and a color component C (cyan) which indicate another set of three primary colors.

In the solid-state imaging device 101, light incident from an object is transmitted through a color filter, the light is then converted by a photodiode to an electrical signal indicating a size of a color corresponding to each pixel, and the electrical signal is output. Note that the color filter has primary colors (RGB) which are arranged in the Bayer pattern.

The A/D converter 102 converts the analog electrical signal output from the solid-state imaging device 101 to a digital signal (hereinafter referred to as Bayer data), and outputs the Bayer data.

The image processing section 103 detects a direction of an edge in the vicinity of a pixel of interest based on a color signal indicating a color component of the pixel of interest and a plurality of color signals indicating color components of a plurality of neighbor pixels. For example, the image processing section 103 receives the Bayer data output from the A/D converter 102 and subjects the Bayer data to various image processing, and outputs resultant image data.

The image processing section 103 comprises a white balance section 104, a gamma correction section 105, an interpolation section 106, a color signal processing section 107, a brightness signal processing section 108, and an output converter 109.

The white balance section 104 receives the Bayer data output from the A/D converter 102, multiplies each pixel value in the Bayer data by a corresponding RGB gain to adjust a white color, and outputs the adjusted Bayer data.

The gamma correction section 105 receives the Bayer data output from the white balance section 104, adjusts the scale of brightness of each pixel value of the Bayer data, and outputs the adjusted Bayer data.

The interpolation section 106 receives, for example, the Bayer data output from the gamma correction section 105, calculates and detects the presence or absence of an edge in the vicinity of a pixel of interest and, if any, a directionality of the edge for each pixel using color signals of a pixel of interest and its neighbor pixels, performs interpolation based on the presence or absence of an edge and, if any, the detected directionality of the edge, and outputs an RGB signal.

The color signal processing section 107 receives the RGB signal output from the interpolation section 106, converts the RGB signal to a color difference signal, performs a psedocolor reduction process or the like, and outputs a color difference signal.

Note that the psedocolor reduction process refers to a process which suppresses a color difference signal in a portion, such as an edge of an image or the like, in which a psedocolor is likely to occur, in case where a color which is not present in an original object (psedocolor) may be generated due to interpolation.

The brightness signal processing section 108 receives the RGB signal output from the interpolation section 106, converts the RGB signal to a brightness signal, performs an edge emphasis process or the like, and outputs the brightness signal.

The output converter 109 receives the color difference signal output from the color signal processing section 107 and the brightness signal output from the brightness signal processing section 108, converts the color difference signal to an RGB signal, an UYVY signal or the like without modification of the brightness signal (the color difference signal is averaged every two pixels), and outputs the resultant signal.

Figure 2:
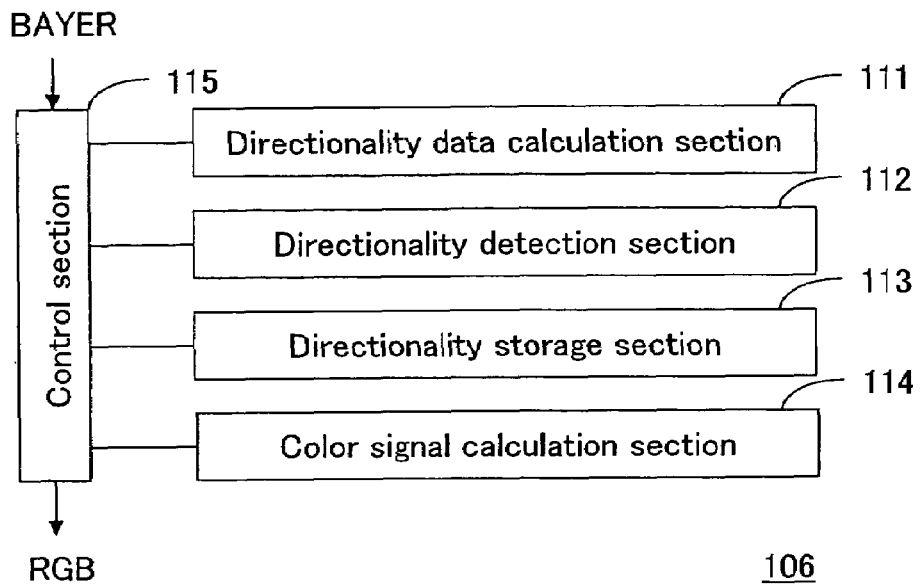
FIG. 2 shows a structure of an interpolation section of FIG. 1.

FIG. 2 shows a structure of the interpolation section 106.

The interpolation section 106 comprises a directionality data calculation section 111, a directionality detection section 112, a directionality storage section 113, a color signal calculation section 114, and a control section 115.

For each pixel of Bayer data to be processed, the directionality data calculation section 111 calculates directionality data which takes a smaller value as a degree of similarity between a designated edge direction and a direction of an actual edge in the vicinity of a pixel of interest is increased, for a plurality of predetermined edge directions.

The directionality detection section 112 detects a directionality of a pixel of interest using the directionality data calculated for a plurality of edge directions calculated by the directionality data calculation section 111, and if necessary, directionality of neighbor pixels stored by the directionality storage section 113 as described below.

The directionality storage section 113 stores the directionality detected by the directionality detection section 112.

The color signal calculation section 114 comprises an interpolation filter. One designated from a plurality of interpolation filters, which corresponds to directionality detected by the directionality detection section 112, and calculates all color signals of a pixel of interest.

The control section 115 is connected to the directionality data calculation section 111, the directionality detection section 112, the directionality storage section 113, and the color signal calculation section 114. The control section 115 controls flows of these processes.

For example, in the example of FIGS. 1 and 2, the solid-state imaging device 101, the A/D converter 102 and the image processing section 103 correspond to a "first color signal detection section of detecting a first color signal indicating a color component of a pixel of interest from the pixel of interest", and a "second color signal detection section of detecting a plurality of second color signals indicating color components of a plurality of neighbor pixels in the vicinity of a pixel of interest from the plurality of neighbor pixels", respectively. The image processing section 103 corresponds to a "direction detection section of detecting a direction of an edge in the vicinity of a pixel of interest based on the first color signal and the plurality of second color signals". Note that the color components of a plurality of neighbor pixels include at least three color components.

However, the image processing apparatus 100 of the present invention is not limited to the example of FIGS. 1 and 2, and may have any structure as long as it has the above-described features: the "first color signal detection section of detecting a first color signal indicating a color component of a pixel of interest from the pixel of interest"; the "second color signal detection section of detecting a plurality of second color signals indicating color components of a plurality of neighbor pixels in the vicinity of a pixel of interest from the plurality of neighbor pixels"; and the "direction detection section of detecting a direction of an edge in the vicinity of a pixel of interest based on the first color signal and the plurality of second color signals".

Figure 3:
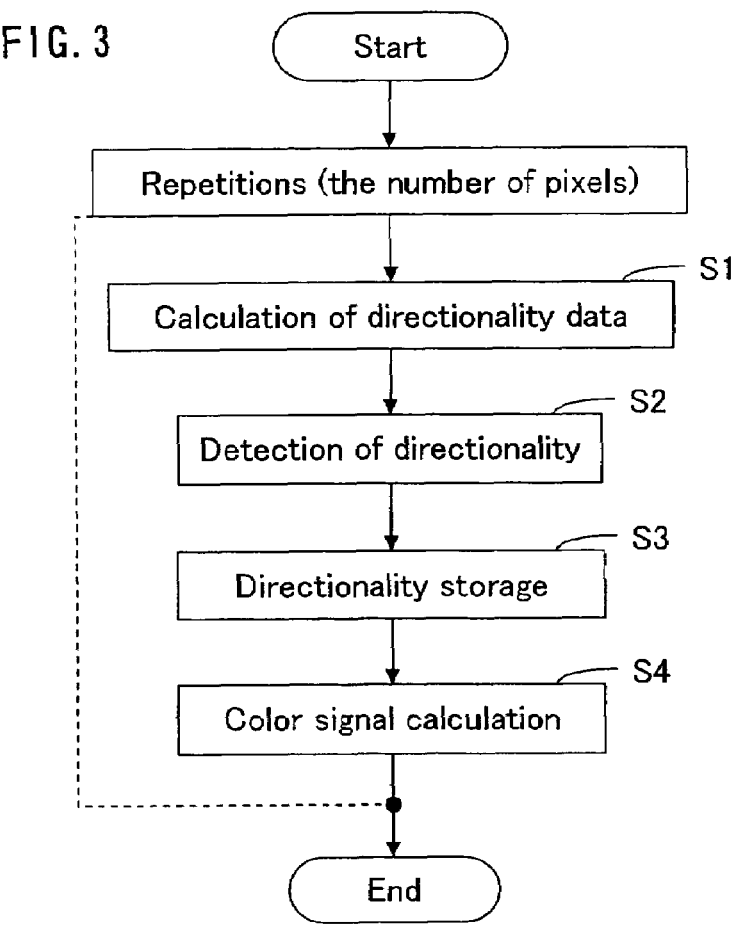
FIG. 3 shows a data processing procedure of the interpolation section of FIG. 2.

FIG. 3 shows a data processing procedure of the interpolation section 106.

Hereinafter, the data processing procedure of the interpolation section 106 will be described step by step with reference to FIG. 3.

Step S1: the directionality data calculation section 111 detects a color signal indicating a color component of a pixel of interest from the pixel of interest, and detects a plurality of color signals indicating color components of a plurality of neighbor pixels in the vicinity of the pixel of interest from the plurality of neighbor pixels. Note that the color components of the neighbor pixels include at least three color components (e.g., three primary colors, i.e., an R component, a G component and a B component). The directionality data calculation section 111 calculates directionality data of the pixel of interest for a plurality of predetermined edge directions. The predetermined edge directions will be described in detail below.

For example, a value indicated by the directionality data of a pixel of interest is decreased as the degree of similarity between the predetermined edge direction and a predetermined edge direction in the vicinity of the pixel of interest is increased. The directionality data may be calculated using various expressions including, for example, the following expression (Expression 2).

(Expression 2)

When a pixel of interest is G33 (see FIG. 16A), $$DDru=(|G51-G33|+|G42-G33|+|G24-G33|+|G15-G33|+|G22-G31|+|G22-G13|+|G44-G53|+|G44-G35|)/2,$$

$$DDho=(|G13-G33|+|G53-G33|+|G22-G42|+|G24-G44|),$$

$$DDrd=(|G11-G33|+|G22-G33|+|G44-G33|+|G55-G33|+|G42-G31|+|G42-G53|+|G24-G13|+|G24-G35|)/2, \text{ and}$$

$$DDve=(|G31-G33|+|G35-G33|+|G22-G24|+|G42-G44|).$$

When the pixel of interest is P33 (see FIG. 16B), $$DDru=(|P33-P51|+|P33-P15|)*2,$$

$$DDho=(|P33-P13|+|P33-P53|)*2,$$

$$DDrd=(|P33-P11|+|P33-P55|)*2, \text{ and}$$

$$DDve=(|P33-P31|+|P33-P35|)*2.$$

In the above-described expressions,

DDru: expression for calculating directionality data of a right-inclined direction,
DDho: expression for calculating directionality data of a horizontal direction,
DDrd: expression for calculating directionality data of a left-inclined direction, and
DDve: expression for calculating directionality data of a vertical direction.

Expression 2 uses pixels having the same component as that of a pixel of interest. Alternatively, when pixels having different color components are used, for example, Expression 3 is used.

(Expression 3)

When a pixel of interest is G33 (see FIG. 16A), $$DDru=\{(|G51-G33|+|G42-G33|+|G24-G33|+|G15-G33|+|G22-G31|+|G22-G13|+|G44-G53|+|G44-G35|)/2+(|P32-P14|+|P52-P34|)+(|Q41-Q23|+|Q43-Q25|)\}/2,$$

$$DDho=\{(|G13-G33|+|G53-G33|+|G22-G42|+|G24-G44|)+(|Q23-Q43|)*2+(|P12-P32|+|P52-P32|+|P14-P34|+|P54-P34|)/2\}/2,$$

$$DDrd=\{(|G11-G33|+|G22-G33|+|G44-G33|+|G55-G33|+|G42-G31|+|G42-G53|+|G24-G13|+|G24-G35|)/2+(|P32-P54|+|P12-P34|)+(|Q21-Q43|+|Q23-Q45|)\}/2, \text{ and}$$

$$DDve=\{(|G31-G33|+|G35-G33|+|G22-G24|+|G42-G44|)+(|P32-P34|)*2+(|Q21-Q23|+|Q25-Q23|+|Q41-Q43|+|Q45-Q43|)/2\}/2.$$

When a pixel of interest is P33 (see FIG. 16B), $$DDru=(|P15-P33|+|P51-P33|)+(|Q42-Q24|)+(|G32-G23|+|G43-G34|)/2,$$

$$DDho=(|P13-P33|+|P53-P33|)+(|G23-G43|)+(|Q22-Q42|+|Q24-Q44|)/2,$$

$$DDrd=(|P11-P33|+|P55-P33|)+(|Q44-Q22|)+(|G32-G43|+|G23-G34|)/2, \text{ and}$$

$$DDve=(|P31-P33|+|P35-P33|)+(|G32-G34|)+(|Q22-Q24|+|Q42-Q44|)/2.$$

Note that, when pixels having different color components are utilized, the expression of each color component is given a weight depending on how much the color component contributes to the brightness.

When weights for the color component G, the color component P and the color component Q are represented by weights Wg, Wp and Wq, respectively, Expression 4 below is used, for example.

(Expression 4)

When a pixel of interest is G33 (see FIG. 16A), $$DDru=\{(|G51-G33|+|G42-G33|+|G24-G33|+|G15-G33|+|G22-G31|+|G22-G13|+|G44-G53|+|G44-G35|)*Wg/2+(|P32-P14|+|P52-P34|)*Wp+(|Q41-Q23|+|Q43-Q25|)*Wq\}/2,$$

$$DDho=\{(|G13-G33|+|G53-G33|+|G22-G42|+|G24-G44|)**Wg+(|Q23-Q43|)*2*Wq+(|P12-P32|+|P52-P32|+|P14-P34|+|P54-P34|)*Wp/2\}/2,$$

$$DDrd=\{(|G11-G33|+|G22-G33|+|G44-G33|+|G55-G33|+|G42-G31|+|G42-G53|+|G24-G13|+|G24-G35|)*Wg/2+(|P32-P54|+|P12-P34|)*Wp+(|Q21-Q43|+|Q23-Q45|)*Wq\}/2, \text{ and}$$

$$DDve=\{(|G31-G33|+|G35-G33|+|G22-G24|+|G42-G44|)*Wg+(|P32-P34|)*2*Wp+(|Q21-Q23|+|Q25-Q23|+|Q41-Q43|+|Q45-Q43|)*Wq/2\}/2.$$

When a pixel of interest is P33 (see FIG. 16B), $$DDru=(|P15-P33|+|P51-P33|)*Wp+(|Q42-Q24|)*Wq+(|G32-G23|+|G43-G34|)*Wg/2,$$

$$DDho=(|P13-P33|+|P53-P33|)*Wp+(|G23-G43|)*Wg+(|Q22-Q42|+|Q24-Q44|)*Wq/2,$$

$$DDrd=(|P11-P33|+|P55-P33|)*Wp+(|Q44-Q22|)*Wq+(|G32-G43|+|G23-G34|)*Wg/2, \text{ and}$$

$$DDve=(|P31-P33|+|P35-P33|)*Wp+(|G32-G34|)*Wg+(|Q22-Q24|+|Q42-Q44|)*Wq/2.$$

A brightness signal Y is calculated from R, G and B signals using Expression 5.

(Expression 5)

$$Y=0.30*R+0.59*G+0.11*B$$

Note that the weights of the color components may be Wr=0.30, Wg=0.59 and Wb=0.11, respectively. These values may be simplified using integers to Wr=3, Wg=6 and Wb=1, respectively.

When the same expression is used irrespective of the color component of a pixel of interest to simplify the implementation, Expression 6 is used, for example (see FIG. 16C).

(Expression 6)

$$DDru=|V51-V33|+|V15-V33|+|V42-V24|+|V41-V23|+|V32-V14|+|V31-V13|+|V52-V34|+|V43-V25|+|V53-V35|,$$

$$DDho=|V13-V33|+|V53-V33|+|V23-V43|+|V12-V32|+|V52-V32|+|V22-V42|+|V14-V34|+|V54-V34|+|V24-V44|,$$

$$DDrd=|V11-V33|+|V55-V33|+|V22-V44|+|V21-V43|+|V32-V54|+|V31-V53|+|V12-V34|+|V23-V45|+|V13-V35|, \text{ and}$$

$$DDve=|V31-V33|+|V35-V33|+|V32-V34|+|V21-V23|+|V25-V23|+|V22-V24|+|V41-V43|+|V45-V43|+|V42-V44|.$$

When the chroma of an object is low (the object is nearly monochromatic), it can be considered that "each pixel value=brightness". Therefore, for example, a difference in pixel value between neighbor pixels is used (Expression 7) (see FIG. 16C). Note that values used in Expression 7 are not associated with color components.

(Expression 7)

$$DDru=|V51-V42|+|V42-V33|+|V33-V24|+|V24-V15|+(|V41-V32|+|V32-V23|+|V23-V14|+|V52-V43|+|V43-V34|+|V34-V25|)*2/3,$$

$$DDho=|V13-V23|+|V23-V33|+|V33-V43|+|V43-V53|+(|V12-V22|+|V22-V32|+|V32-V42|+|V42-V52|+|V14-V24|+|V24-V34|+|V34-V44|+|V44-V54|)/2,$$

$$DDrd=|V11-V22|+|V22-V33|+|V33-V44|+|V44-V55|+(|V21-V32|+|V32-V43|+|V43-V54|+|V12-V23|+|V23-V34|+|V34-V45|)*2/3, \text{ and}$$

$$DDve=|V31-V32|+|V32-V33|+|V33-V34|+|V34-V35|+$$

$$(|V21-V22|+|V22-V23|+|V23-V24|+|V24-V25|+|V41-V42|+|V42-V43|+|V43-V44|+|V44-V45|)/2.$$

Alternatively, Expression 8 can be used.
(Expression 8)

$$DDru=|V42-V33|+|V33-V24|+|V41-V32|+|V32-V23|+|V23-V14|+|V52-V43|+|V43-V34|+|V34-V25|,$$

$$DDho=|V13-V23|+|V23-V33|+|V33-V43|+|V43-V53|+|V22-V32|+|V32-V42|+|V24-V34|+|V34-V44|,$$

$$DDrd=|V22-V33|+|V33-V44|+|V21-V32|+|V32-V43|+|V43-V54|+|V12-V23|+|V23-V34|+|V34-V45|, \text{ and}$$

$$DDve=|V31-V32|+|V32-V33|+|V33-V34|+|V34-V35|+|V22-V23|+|V23-V24|+|V42-V43|+|V43-V44|.$$

Step S2: the directionality detection section 112 detects a direction of an edge in the vicinity of a pixel of interest based on a color signal indicating a color component of the pixel of interest from the pixel of interest and a plurality of color signals indicating color components of a plurality of neighbor pixels. For example, the directionality detection section 112 detects the directionality of the pixel of interest based on the calculated directionality data. A method of detecting the directionality of a pixel of interest (a data processing procedure of the directionality detection section 112) will be described in detail below.

Step S3: the directionality storage section 113 stores the detected directionality into a memory (not shown).

Step S4: the color signal calculation section 114 calculates all color signals of a pixel of interest using an interpolation filter designated among a plurality of interpolation filters corresponding to the detected directionality. A method of calculating a color signal (a data processing procedure of the color signal calculation section 114) will be described in detail below.

After step S4, steps S1 to S4 are repeatedly performed a number of times corresponding to the number of pixels in an interpolation designated region in the input Bayer data.

For example, in the example of FIG. 3, step S1 corresponds to "detecting a first color signal indicating a color component of a pixel of interest from the pixel of interest" and "detecting a plurality of second color signals indicating color components of a plurality of neighbor pixels in the vicinity of a pixel of interest from the plurality of neighbor pixels", and "detecting a direction of an edge in the vicinity of a pixel of interest based on the first color signal and the plurality of second color signals". Note that the color components of a plurality of neighbor pixels include at least three color components.

However, the image processing method of the present invention is not limited to the example of FIG. 3, and may have any procedure as long as it can perform: "detecting a first color signal indicating a color component of a pixel of interest from the pixel of interest"; "detecting a plurality of second color signals indicating color components of a plurality of neighbor pixels in the vicinity of a pixel of interest from the plurality of neighbor pixels"; and "detecting a direction of an edge in the vicinity of a pixel of interest based on the first color signal and the plurality of second color signals".

Figure 4:
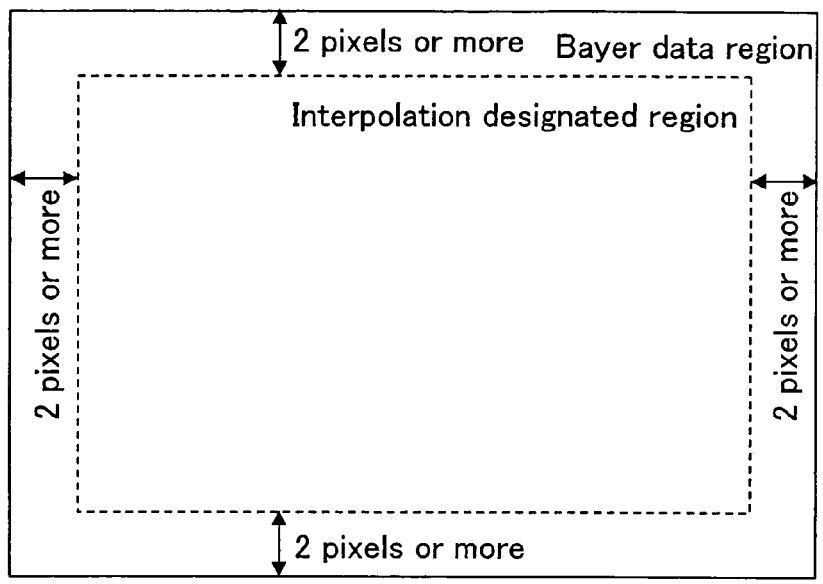
FIG. 4 shows an interpolation designated region in an input Bayer data region.

FIG. 4 shows an interpolation designated region in an input Bayer data region.

It is assumed that an interpolation designated region represented with a dashed line is located within a Bayer data region represented with a solid line, and Bayer data having a width of 2 pixels or more is present on an upper outside, a lower outside, a right outside and a left outside of the interpolation designated region. This assumption is provided in order to obtain information about neighbor pixels required for interpolation for pixels located in a boundary portion of the interpolation designated region. The term "plurality of neighbor pixels located in the vicinity of a pixel of interest" refers to eight pixels adjoining a pixel of interest A, for example. Neighbor pixels may include 16 pixels which surround 8 pixels adjoining the pixel of interest A. Neighbor pixels are a number of pixels which are required for interpolation, and may be any number of pixels as long as they are located to surround the pixel of interest A.

Note that, in Example 1, a plurality of edge directions include four directions: a right-inclined direction; a horizontal direction; a left-inclined direction; and a vertical direction.

Figure 5:
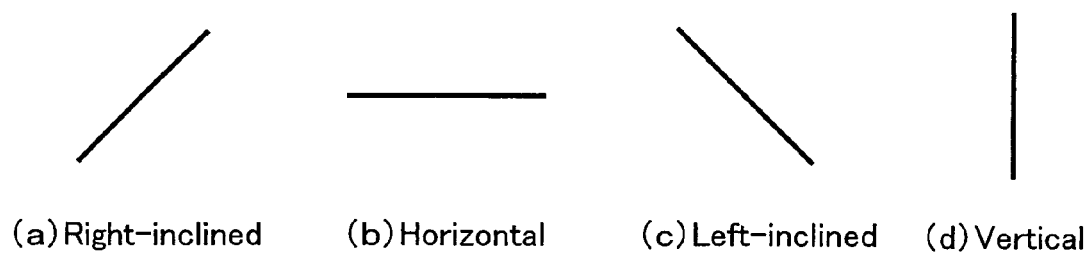
FIG. 5 shows the edge directions used in Example 1 (a right-inclined direction, a horizontal direction, a left-inclined direction, and a vertical direction).

FIG. 5 shows the edge directions used in Example 1 (a right-inclined direction, a horizontal direction, a left-inclined direction, and a vertical direction).

Note that the edge directions are not limited to the four directions: the right-inclined direction; the horizontal direction; the left-inclined direction; and the vertical direction, and may be, for example, eight directions. In a minute region, the four directions can be generally used for approximation.

Figure 6:
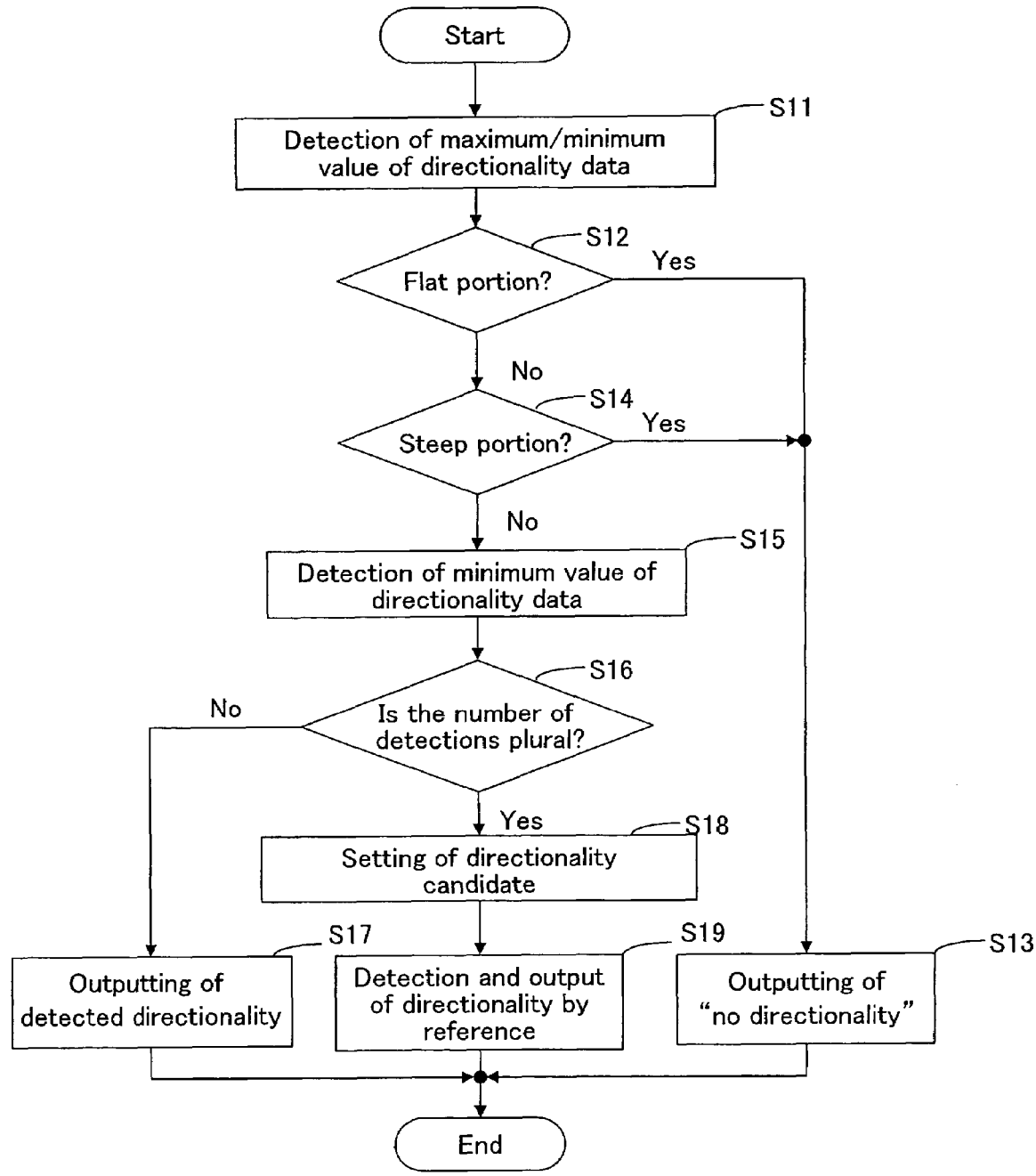
FIG. 6 shows a data processing procedure of a directionality detection section of FIG. 1.

FIG. 6 shows a data processing procedure of the directionality detection section 112.

Hereinafter, the data processing procedure of the directionality detection section 112 will be described step by step with reference to FIG. 6.

Step S11: a maximum value and a minimum value of the four pieces of directionality data calculated in step S1 are detected.

Step S12: it is determined whether or not the maximum value of the directionality data detected in step S11 is smaller than a threshold A stored in a register (not shown), i.e., whether or not a brightness gradient is smooth and flat though there is no edge near a pixel of interest. Note that the threshold A will be described in detail below.

When the brightness gradient is flat, the procedure goes to step S13.

When the brightness gradient is not flat, the procedure goes to step S14.

Step S13: a signal indicating "no directionality" is output, and the detection of directionality of a pixel of interest is ended. The signal indicating "no directionality" indicates that, for example, there is no edge in the vicinity of a detected pixel of interest.

Step S14: it is determined whether or not the minimum value of the directionality data detected in step S11 is larger than the threshold B stored in a register (not shown), i.e., whether or not a brightness gradient is steep though there is no edge in the vicinity of the pixel of interest. Note that the threshold B will be described in detail below.

When the brightness gradient is steep, the procedure goes to step S13.

When the brightness gradient is not steep, the procedure goes to step S15.

Step S15: one or more directionalities are detected in order of value from the smallest, from the four pieces of directionality data calculated in step S1.

As an example of a specific detection method, a directionality corresponding to the directionality data is detected if (Expression 9) below is satisfied.

(Expression 9)

$$DDmin \geqq \text{threshold } D * DDi$$

DDi: directionality data of the pixel of interest
DDmin: minimum value of directionality data A range of the threshold D is $0 \leqq$ the threshold $D \leqq 1$. The larger the threshold D, the smaller the number of detected directionalities. The smaller the threshold D, the larger the number of detected directionalities.

Step S16: it is determined whether or not the number of detected directionalities detected in step S14 is plural.

When the number of detected directionalities detected in step S14 is not plural, the procedure goes to step S17.

When the number of detected directionalities detected in step S14 is plural, the procedure goes to step S18.

Step S17: the directionality detected in step S15 is output. The detection of directionality of the pixel of interest is ended.

Step S18: a directionality which is a candidate for the directionality of the pixel of interest (hereinafter referred to as a directionality candidate) is set.

As an example of a specific setting method, a plurality of directionalities detected in step S15 may be set as directionality candidates. Alternatively, a plurality of directionalities detected in step S15, and in addition, "no directionality", may be set as directionality candidates.

By adding "no directionality" to the directionality candidates, if the number of pixels having "no directionality" is largest among referenced pixels in step S19, the pixel of interest can be determined to have "no directionality".

Step S19: by referencing directionalities of pixels located in the vicinity of the pixel of interest, the directionality of the pixel of interest is detected among the directionality candidates set in step S18.

Figure 7:
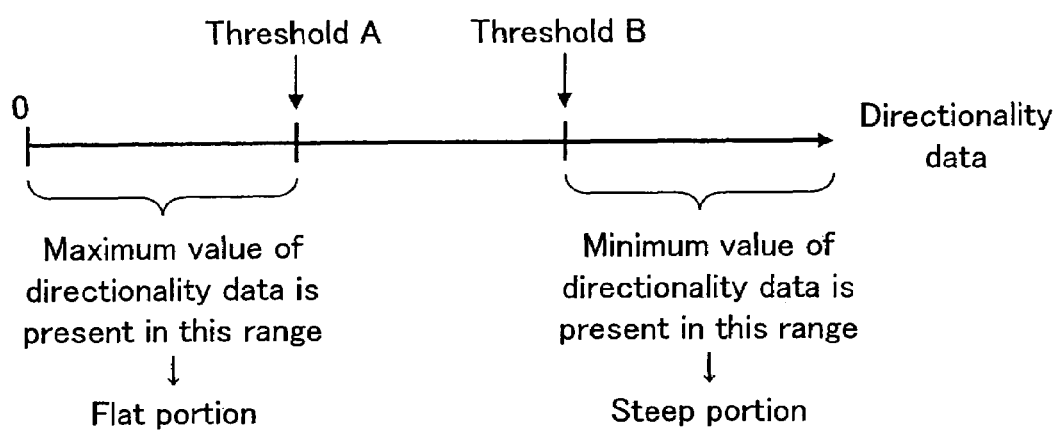
FIG. 7 shows a threshold A and a threshold B.

FIG. 7 shows the threshold A and the threshold B.

A range of the threshold A varies depending on an expression for calculating directionality data. In general, as the threshold A is increased, the number of pixels which are determined to be located in a flat portion is increased, and as the threshold A is decreased, the number of pixels which are determined to be located in a flat portion is decreased.

A range of the threshold B varies depending on an expression for calculating directionality data. In general, as the threshold B is increased, the number of pixels which are located in a steep portion is decreased, and as the threshold B is decreased, the number of pixels which are located in a steep portion is increased.

In addition, the threshold A and the threshold B satisfy $0 \leqq$ the threshold $A \leqq$ the threshold B.

Note that, in step S11, a total value of directionality data is calculated instead of the maximum value of the directionality data, and further in step S12, it may be determined whether or not the total value of the directionality data detected in step S11 is smaller than a threshold C stored in a register (not shown).

A range of the threshold C varies depending on an expression for calculating directionality data. In general, as the threshold C is increased, the number of pixels which are determined to be located in a flat portion is increased; and as the threshold C is decreased, the number of pixels which are determined to be located in a flat portion is decreased.

A specific method of detecting the directionality of the pixel of interest in step S19 will be described. For example, for each directionality candidate, referenced pixels having the same directionality as that of the directionality candidate are counted. A directionality candidate having a largest count is output as the directionality of the pixel of interest. Note that, when there are a plurality of directionality candidates having a largest count, "no directionality" is output. Here, as the referenced pixels, pixels as close to the pixel of interest as possible are preferably used. The closer the pixel, the higher the degree of correlation between the pixel and the pixel of interest. Therefore, pixels adjoining the pixel of interest are used as referenced pixels.

FIGS. 8A to 8C show examples of referenced pixels.

As an example of specific referenced pixels, when the procedure is caused to proceed downward from the top pixel row of an image, and rightward from the leftmost pixel in the same row, the already-determined directionalities of four pixels V22, V32, V42 and V23 are taken out from a memory (not shown) and are referenced as shown in FIG. 8A.

As another example, the directionality of an adjoining pixel which has not yet determined is separately detected, and a result of the detection is referenced. A method of detecting directionality separately will be described below.

For example, when the directionality separate detection can be performed with respect to a pixel adjoining the right side of the pixel of interest, the accuracy of the directionality detection is improved by referencing the directionality of V43 which is detected separately in addition to V22, V32, V42 and V23, as in FIG. 8B.

Further, when the directionality separate detection can be performed with respect to a pixel adjoining the right side of the pixel of interest and a pixel adjoining the lower side of the pixel of interest, the accuracy of the directionality detection is improved by referencing the directionalities of V43, V24, V34 and V44 detected separately in addition to V22, V32, V42 and V23, as in FIG. 8C.

As described above, there are a variety of referenced pixels. Other combinations of referenced pixels may be used in addition to those of FIGS. 8A to 8C.

FIG. 9 shows a procedure of the directionality separate detection in step S19.

Hereinafter, the directionality separate detection procedure will be described step by step with reference to FIG. 9.

Steps S11 to S17 of FIG. 9 are similar to step S11 to S17 of FIG. 6 and will not be explained.

Step S21: when there are a plurality of directionalities detected in step S16, "unknown directionality" is output, and the procedure is ended. This means that, when the directionality of another pixel is not referenced, the directionality of a pixel of interest cannot be specified by the directionality separate detection.

Hereinafter, a method of calculating a color signal of a pixel of interest using an interpolation filter among a plurality of interpolation filters which corresponds to the directionality detected by the color signal calculation section 114 (step S4) in step S2, will be described in detail.

Firstly, a color signal calculation expression (Expression 10) when an interpolation filter 1 is used and "directionality is present", is shown. The term "directionality is present" means that, for example, there is an edge in the vicinity of a pixel of interest.

(Expression 10)
When a pixel of interest is G33 (see FIG. 16A),
a) right-inclined direction:

$Go=(G15+G24*2+G33*2+G42*2+G51)/8;$ $Po=(P14+P34+P32+P52)/4;$ and $Qo=(Q23+Q25+Q43+Q41)/4,$ b) horizontal direction:

$Go=(G13+G33*2+G53)/4;$ $Po=(P12+P14+P32*2+P34*2+P52+P54)/8;$ and $Qo=(Q23+Q43)/2,$ c) left-inclined direction:

$Go=(G11+G22*2+G33*2+G44*2+G55)/8;$ $Po=(P12+P34+P32+P54)/4;$ and $Qo=(Q21+Q23+Q43+Q45)/4,$ d) vertical direction:

$Go=(G31+G33*2+G35)/4;$ $Po=(P32+P34)/2;$ and $Qo=(Q21+Q41+Q23*2+Q43*2+Q25+Q45)/8.$ When a pixel of interest is P33 (see FIG. 16B),
a) right-inclined direction:

$Go=(G14+G25+G23*2+G34*2+G32*2+G43*2+G41+G52)/12;$ $Po=(P15+P33*2+P51)/4;$ and $Qo=(Q42+Q24)/2,$ b) horizontal direction:

$Go=(G23+G43)/2;$ $Po=(P13+P33*2+P53)/4;$ and $Qo=(Q22+Q24+Q42+Q44)/4,$ c) left-inclined direction:

$Go=(G12+G21+G23*2+G32*2+G34*2+G43*2+G45+G54)/12;$ $Po=(P11+P33*2+P55)/4;$ and $Qo=(Q22+Q44)/2,$ d) vertical direction:

$Go=(G32+G34)/2;$ $Po=(P31+P33*2+P35)/4;$ and $Qo=(Q22+Q24+Q42+Q44)/4.$

The interpolation filter 1 subjects data to filtering in accordance with an interpolation expression which maintains an edge present in the vicinity of a pixel of interest.

Next, a color signal calculation expression (Expression 11) when an interpolation filter 2 is used and "directionality is present", will be described.

(Expression 11)
When a pixel of interest is G33 (see FIG. 16A),
a) right-inclined direction:

$Go=(G24+G33*2+G42)/4;$ $Po=(P14+P34+P32+P52)/4;$ and $Qo=(Q23+Q25+Q43+Q41)/4,$ b) horizontal direction:

$Go=(G13*2+G33*8+G53*2+G22+G42+G24+G44)/16;$ $Po=(P32+P34)/2;$ and $Qo=(Q23+Q43)/2,$ c) left-inclined direction:

$Go=(G22+G33*2+G44)/4;$ $Po=(P12+P34+P32+P54)/4;$ and $Qo=(Q21+Q23+Q43+Q45)/4,$ d) vertical direction:

$Go=(G31*2+G33*8+G35*2+G22+G24+G42+G44)/16;$ $Po=(P32+P34)/2;$ and $Qo=(Q23+Q43)/2.$ When a pixel of interest is P33 (see FIG. 16B)
a) right-inclined direction:

$Go=(G14+G25+G23+G34+G32+G43+G41+G52)/8;$ $Po=P33;$ and $Qo=(Q42+Q24)/2,$ b) horizontal direction:

$Go=(G23*3+G43*3+G32+G34)/8;$ $Po=(P13+P33*6+P53)/8;$ and $Qo=(Q22+Q24+Q42+Q44)/4,$ c) left-inclined direction:

$Go=(G12+G21+G23+G32+G34+G43+G45+G54)/8;$ $Po=P33;$ and $Qo=(Q22+Q44)/2,$ d) vertical direction:

$Go=(G32*3+G34*3+G23+G43)/2;$ $Po=(P31+P33*6+P35)/8;$ and $Qo=(Q22+Q24+Q42+Q44)/4.$ The interpolation filter 2 is an intermediate filter between the interpolation filter 1 and the bilinear method. By using the interpolation filter 2, its lowpass filter-like property makes it possible to generate a smooth image in which noise is not noticeable while an edge present in the vicinity of a pixel of interest is maintained. Further, among 5×5 pixels in a process range, pixels at four corners which are most distant from a pixel of interest at a center thereof, are not used. Therefore, image deterioration due to interpolation can be reduced. This is because the four corner pixels are at a distance from the pixel of interest, and therefore, a correlation between the four corner pixels and the pixel of interest may be low.

Next, a color signal calculation expression (Expression 12) when an interpolation filter 3 is used and "directionality is present", will be described.

(Expression 12)

When a pixel of interest is G33 (see FIG. 16A), a) right-inclined direction:

$Go=(G24+G33*2+G42)/4;$ $Po=(P14+P34+P32+P52)/4;$ and $Qo=(Q23+Q25+Q43+Q41)/4,$ b) horizontal direction:

$Go=(G13+G33*2+G53)/4;$ $Po=(P12+P14+P32*2+P34*2+P52+P54)/8;$ and $Qo=(Q23+Q43)/2,$ c) left-inclined direction:

$Go=(G22+G33*2+G44)/4;$ $Po=(P12+P34+P32+P54)/4;$ and $Qo=(Q21+Q23+Q43+Q45)/4,$ d) vertical direction:

$Go=(G31+G33*2+G35)/4;$ $Po=(P32+P34)/2;$ and $Qo=(Q21+Q41+Q23*2+Q43*2+Q25+Q45)/8.$ When a pixel of interest is P33 (see FIG. 16B), a) right-inclined direction:

$Go=(G14+G25+G23*3+G34*3+G32*3+G43*3+G41+G52)/16;$ $Po=(P15+P33*2+P51)/4;$ and $Qo=(Q42+Q24)/2,$ b) horizontal direction:

$Go=(G23+G43)/2;$ $Po=(P13+P33*2+P53)/4;$ and $Qo=(Q22+Q24+Q42+Q44)/4,$ c) left-inclined direction:

$Go=(G12+G21+G23*3+G32*3+G34*3+G43*3+G45+G54)/16;$ $Po=(P11+P33*2+P55)/4;$ and $Qo=(Q22+Q44)/2,$ d) vertical direction:

$Go=(G32+G34)/2;$ $Po=(P31+P33*2+P35)/4;$ and $Qo=(Q22+Q24+Q42+Q44)/4.$

The interpolation filter 3 is a center-weighted filter in which pixels in the vicinity of a center are weighted to a larger extent in calculation of a G signal in inclined (right-inclined and left-inclined) directions as compared to the interpolation filter 1. By utilizing the interpolation filter 3, pixels in the vicinity of the center which have a higher level of correlation with a pixel of interest in the inclined directions, are weighted to a larger extent, thereby making a deterioration in image in the inclined directions due to interpolation less noticeable.

A color signal calculation expression (Expression 13) when an interpolation filter 4 is used and "directionality is present", will be described.

(Expression 13)

When a pixel of interest is G33 (see FIG. 16A), a) right-inclined direction:

$Go=(G24+G33*2+G42)/4;$ $Po=(P14*3+P34*3+P32*3+P52)/8;$ and $Qo=(Q23*3+Q25+Q43*3+Q41)/8,$ b) horizontal direction:

$Go=(G13*2+G33*8+G53*2+G22+G42+G24+G44)/16;$ $Po=(P32+P34)/2;$ and $Qo=(Q23+Q43)/2,$ c) left-inclined direction:

$Go=(G22+G33*2+G44)/4;$ $Po=(P12+P34*3+P32*3+P54)/8;$ and $Qo=(Q21+Q23*3+Q43*3+Q45)/8,$ d) vertical direction:

$$Go=(G31*2+G33*8+G35*2+G22+G24+G42+G44)/16;$$

$$Po=(P32+P34)/2; \text{ and}$$

$$Qo=(Q23+Q43)/2.$$

When a pixel of interest is P33 (see FIG. 16B), a) right-inclined direction:

$$Go=(G14+G25+G23*3+G34*3+G32*3+G43*3+G41+G52)/16;$$

$$Po=P33; \text{ and}$$

$$Qo=(Q42+Q24)/2,$$

b) horizontal direction:

$$Go=(G23*3+G43*3+G32+G34)/8;$$

$$Po=(P13+P33*6+P53)/8; \text{ and}$$

$$Qo=(Q22+Q24+Q42+Q44)/4,$$

c) left-inclined direction:

$$Go=(G12+G21+G23*3+G32*3+G34*3+G43*3+G45+G54)/16;$$

$$Po=P33; \text{ and}$$

$$Qo=(Q22+Q44)/2,$$

d) vertical direction:

$$Go=(G32*3+G34*3+G23+G43)/2;$$

$$Po=(P31+P33*6+P35)/8; \text{ and}$$

$$Qo=(Q22+Q24+Q42+Q44)/4.$$

The interpolation filter 4 is a center-weighted filter in which pixels in the vicinity of a center are weighted to a larger extent in calculation of a signal in inclined (right-inclined and left-inclined) directions in addition to the feature of the interpolation filter 2. By weighting pixels in the vicinity of the center which have a higher level of correlation with a pixel of interest in the inclined directions to a larger extent, a deterioration in image in the inclined directions due to interpolation is caused to be less noticeable.

As described above, there are a variety of interpolation filters. Further, other interpolation filters may be used.

In the color signal calculation section 114, one is selected from the above-described interpolation filters, thereby making it possible to calculate a color signal of a pixel of interest. Therefore, it is possible to adjust the quality of an output image.

For example, when an image of an artificial object having a sharp edge is captured, the interpolation filter 1 may used. When an image of a natural object having a soft edge is captured, the interpolation filter 2 may be used. Thus, the interpolation filters may be selected, depending on situations.

As an example of a color signal calculation expression used in the case of "no directionality", a conventional bilinear method (Expression 1) is used. As another example, for calculation of a G signal in the case of "no directionality", results of the flat portion determination in step S12 and the steep portion detection in step S14 may be utilized. In this case, (Expression 14) below is used for calculation.

(Expression 14)

When a pixel of interest is G33 (see FIG. 16A), a) when the pixel of interest is determined to be in a "flat portion", $$Go=(G33*4+G22+G42+G24+G44)/8,$$

b) when the pixel of interest is determined to be in a "steep portion", $$Go=G33,$$

c) others (when the pixel of interest is neither in a "flat portion" nor in a "steep portion"), $$Go=(G33*12+G22+G42+G24+G44)/16.$$

When a pixel of interest is P33 (see FIG. 16B), a) when the pixel of interest is determined to be in a "flat portion", $$Go=(G32+G23+G43+G34)/4,$$

b) when the pixel of interest is in a "steep portion", $$Go=\text{Median}(G32, G23, G43, G34),$$

c) others (when the pixel of interest is neither in a "flat portion" nor in a "steep portion"), $$Go=(G32+G23+G43+G34)/4, \text{ or}$$

$$Go=\text{Median}(G32, G23, G43, G34),$$

where Median(G32, G23, G43, G34) indicates a middle value of four signals G32, G23, G43 and G34, i.e., an average value of two signals excluding maximum and minimum values.

Note that, for calculation of color signals other than the G signal, the conventional bilinear method (Expression 1) is used.

As described above, the case of a "flat portion", the case of a "steep portion", and the case of neither a "flat portion" nor a "steep portion" are separated. Therefore, interpolation can be performed while maintaining a high frequency component which is much contained in a steep portion (the high frequency component refers to a component having a high spatial frequency in a brightness signal). In other words, it is possible to prevent a decrease in resolution due to interpolation.

Thus, according to Example 1, it is possible to obtain a high-quality image maintaining an edge component, thereby making it possible to provide a high-performance imaging apparatus.

EXAMPLE 2

Hereinafter, Example 2 of the present invention will be described with reference to the accompanying drawings.

A procedure of Example 2 is substantially the same as that of Example 1, except that a means for storing directionality, such as a line memory, a frame memory or the like, is not provided in a hardware structure.

Figure 10:
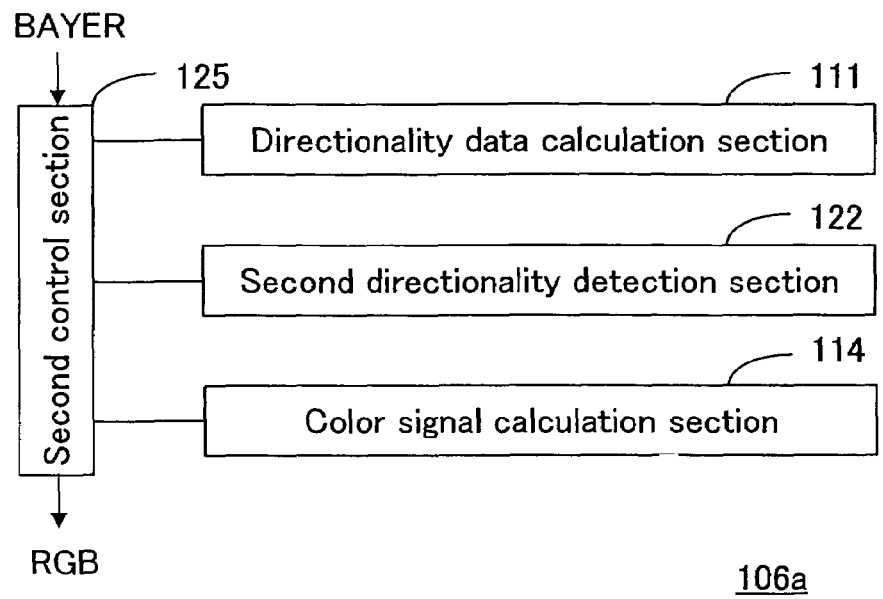
FIG. 10 shows a structure of another interpolation section.

FIG. 10 shows a structure of an interpolation section 106a.

In FIG. 10, the same parts as those of FIG. 2 are referenced with the same reference numerals and will not be explained.

The interpolation section 106a has a structure similar to that of the interpolation section 106, except that the interpolation section 106a includes a second directionality detection section 122 instead of the directionality detection section 112, and a second control section 125 instead of the control section 115, and does not include the directionality storage section 113.

The second directionality detection section 122 detects the directionality of a pixel of interest with reference to directionality data corresponding to a plurality of edge directions calculated by the directionality data calculation section 111, and if necessary, the directionalities of adjoining pixels separately detected.

The second control section 125 is connected to each block in the directionality data calculation section 111, the second directionality detection section 122 and the color signal calculation section 114 to control flows of procedures.

Figure 11:
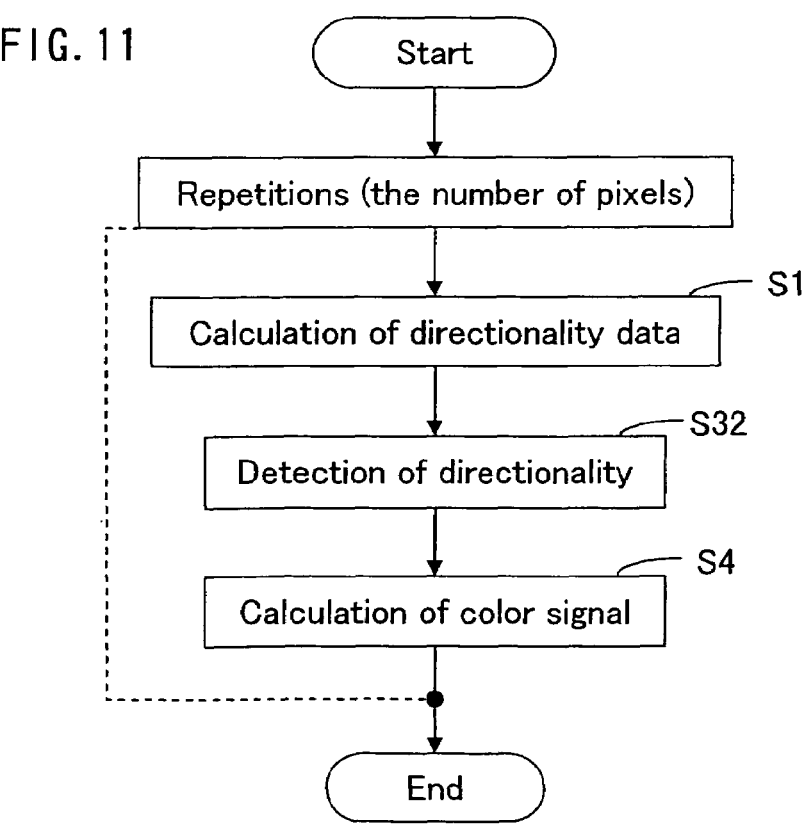
FIG. 11 shows a data processing procedure of the interpolation section of FIG. 10.

FIG. 11 shows a data processing procedure of the interpolation section 106a.

Hereinafter, the data processing procedure of the interpolation section 106a will be described step by step with reference to FIG. 11.

Each of step S1, step S32 and step S4 is repeatedly performed a number of times corresponding to the number of pixels in an interpolation designated region within an input Bayer data region (see FIG. 4).

Step S1: a process similar to that of step S1 of FIG. 3 is performed.

Step S32: the second directionality detection section 122 detects the directionality of a pixel of interest using the directionality data calculated in step S1.

The detection is performed using a detection method substantially similar to the detection method of Example 1 in FIG. 6. However, when referencing the directionalities of adjoining pixels in step S19, since the directionalities of the four pixels V22, V32, V42 and V23 of FIG. 8A are not stored, the directionality separate detection process of FIG. 9 separately detects and references the directionalities of V22, V32, V42 and V23.

As another example, a means for storing only a directionality of the previous pixel is provided, and the directionality of the previous pixel (i.e., the directionality of V23 stored) is used when referencing the directionalities of adjoining pixels, thereby making it possible to improve the accuracy of directionality detection.

Note that, also in Example 2, there are a variety of referenced pixels, and combinations other than the combination of referenced pixels of FIGS. 8A to 8C may be used.

Step S4: a process similar to that of step S4 in FIG. 3 is performed.

Thus, according to Example 2, even when a means for storing directionality is not provided, the present invention can be applied, thereby making it possible to achieve a simple and small hardware structure and a reduction in cost.

EXAMPLE 3

Hereinafter, Example 3 of the present invention will be described with reference to the accompanying drawings.

In Example 3, after the directionalities of all pixels in an interpolation designated region are detected using convergence calculation, the directionalities are corrected. Further, based on the detected and corrected directionalities, the color signals of all the pixels in the interpolation designated region are calculated.

Figure 12:
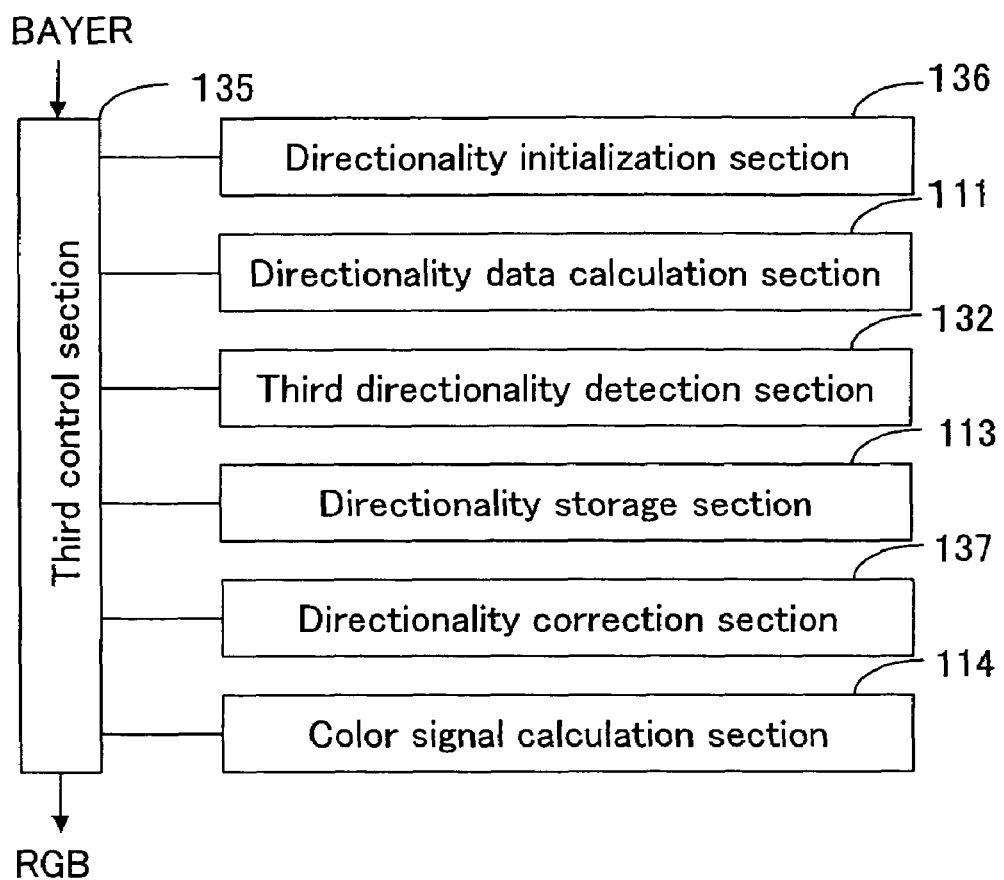
FIG. 12 shows a structure of another interpolation section.

FIG. 12 shows a structure of an interpolation section 106b.

In FIG. 12, the same parts as those of FIG. 2 are referenced with the same reference numerals and will not be explained.

The interpolation section 106b includes a directionality initialization section 136, a directionality data calculation section 111, a third directionality detection section 132, a directionality storage section 113, a directionality correction section 137, a color signal calculation section 114, and a third control section 135.

The directionality initialization section 136 memorizes in a memory (not shown) that the directionalities of all pixels in a Bayer data region are "unknown directionalities".

The third directionality detection section 132 detects the directionality of a pixel of interest by referencing directionality data of a plurality of edge directions calculated by the directionality data calculation section 111, and if necessary, the directionalities of adjoining pixels.

The directionality correction section 137 corrects directionality in an interpolation designated region which has been detected.

The third control section 135 is connected to the directionality initialization section 136, the directionality data calculation section 111, the third directionality detection section 132, directionality storage section 113, the directionality correction section 137, and the color signal calculation section 114, and controls flows of them.

Figure 13:
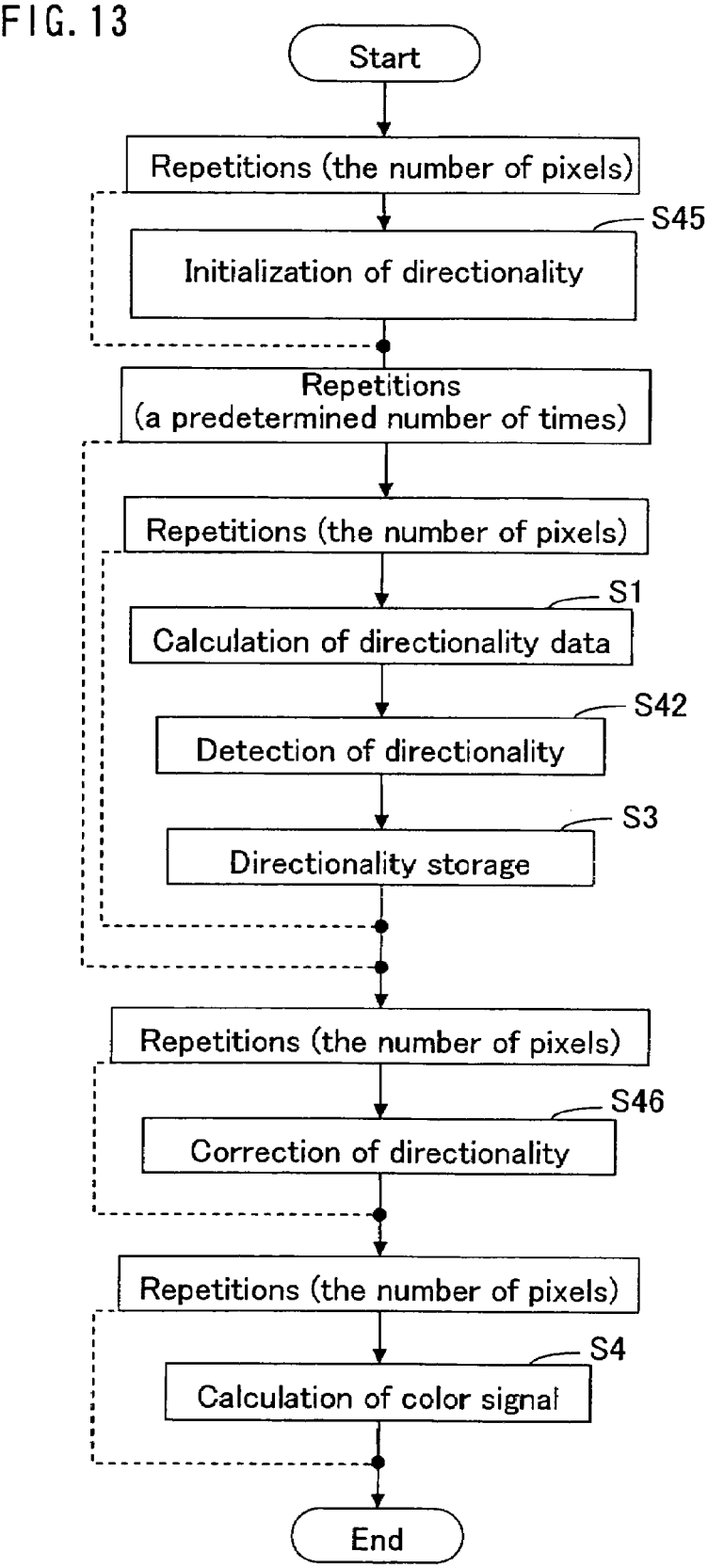
FIG. 13 shows a data processing procedure of the interpolation section of FIG. 12.

FIG. 13 shows a data processing procedure of the interpolation section 106b.

Hereinafter, the data processing procedure of the interpolation section 106b will be described step by step with reference to FIG. 13.

A process of step S45 is repeatedly performed a number of times corresponding to the number of pixels in an input Bayer data region.

Step S45: the directionality initialization section 136 memorizes, in a memory (not shown), information that the directionality of a pixel of interest is "unknown directionality".

A process of each of steps S1, S42 and S3 is repeatedly performed a designated number of times. The designated number of times is preferably two or more.

Each of steps S1, S42 and S3 are repeatedly performed a number of times corresponding to the number of pixels in an interpolation designated region.

Step S1: a process similar to that of step S1 in FIG. 3 is performed.

Step S42: the third directionality detection section 132 detects the directionality of a pixel of interest using the directionality data calculated in step S1.

For the detection, a detection method substantially similar to that of Example 1 in FIG. 6 is used. In this case, eight adjoining pixels V22, V32, V42, V23, V43, V24, V34 and V44 in FIG. 8C, i.e., the directionalities of all adjoining pixels, are referenced in step S19.

In this case, in the first process among the designated number of times of the process, no directionalities have been detected for four pixels V43, V24, V34 and V44, i.e., the initial state "unknown directionality". Separate detection is not performed and the initial state is referenced.

In the second process and thereafter among the designated number of times of the process, certain directionalities of the four pixels V43, V24, V34 and V44 have also been detected and are stored in or before the previous process. By referencing the directionalities, detection accuracy can be improved.

Step S3: a process similar to that of step S3 in FIG. 3 is performed.

A process of step S46 is repeatedly performed a number of times corresponding to the number of pixels in an interpolation designated region.

The directionality correction section 137 corrects the directionality which has been detected in the interpolation designated region. The correction method will be described in detail below.

Finally, a process of step S4 is repeatedly performed a number of times corresponding to the number of pixels in the interpolation designated region.

Step S4 performs a process similar to that of step S4 in FIG. 3.

Note that the process in which step S46 of FIG. 13 is repeatedly performed a number of times corresponding to the number of pixels in the interpolation designated region can be omitted. In this case, the directionality correction section 137 of FIG. 12 is also omitted.

Figure 14:
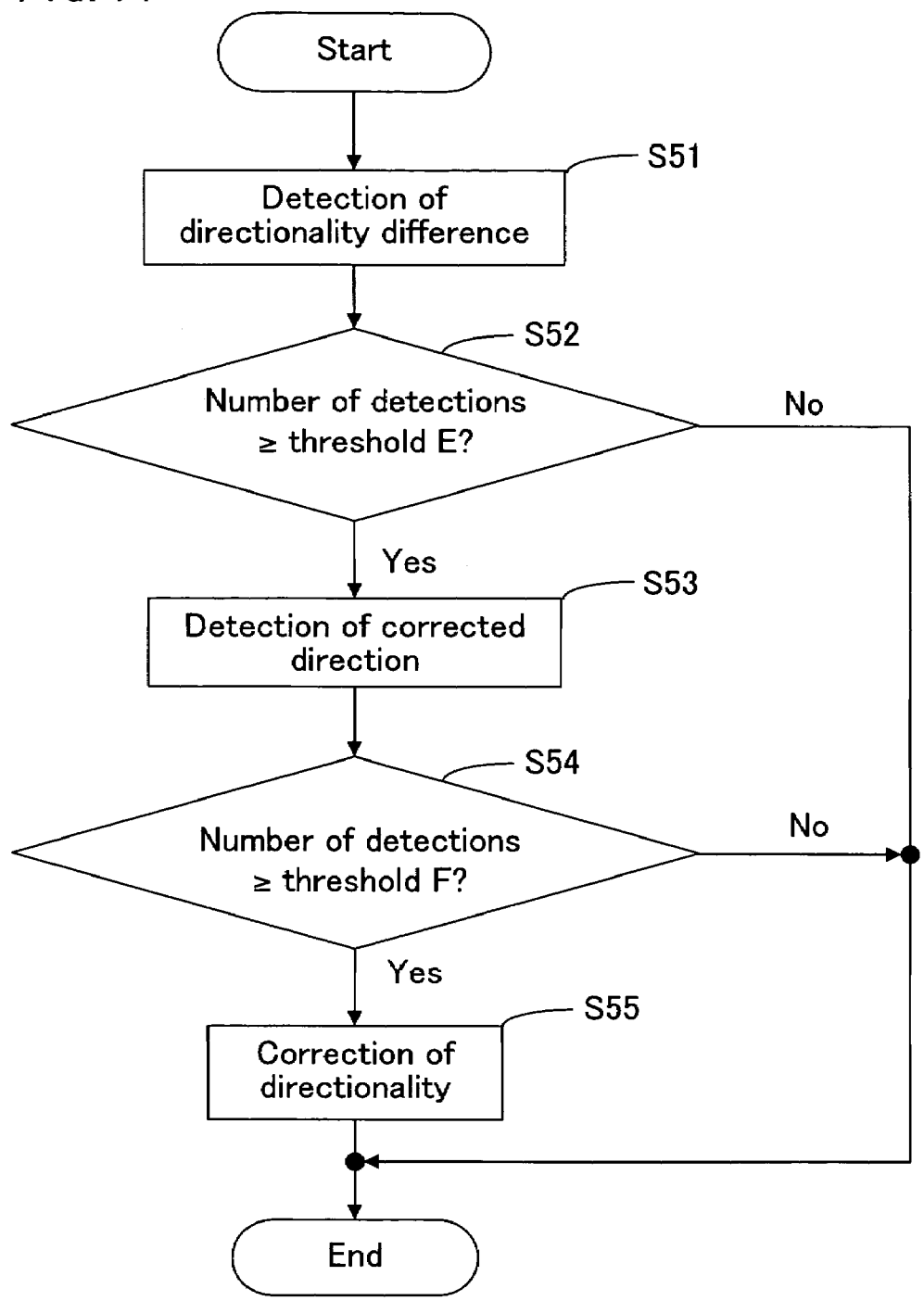
FIG. 14 shows a data processing procedure of a directionality correction section of FIG. 1.

FIG. 14 shows a data processing procedure of the directionality correction section 137.

Directionality is corrected by utilizing a property such that pixels closer to each other have a higher level of correlation in terms of directionality.

In steps S51 and S52, it is determined how much the directionality of a pixel of interest is different from the directionalities of adjoining pixels. If the directionality of the pixel of interest is different from the directionalities of a number of adjoining pixels, it is assumed that the directionality of the pixel of interest is false.

Further, when the directionality of the pixel of interest is assumed to be false, in the next steps S53 and S54 a true directionality of the pixel of interest is determined. When the true directionality is detected, in step S55 the directionality of a pixel of interest is corrected to the true directionality.

Hereinafter, a data processing procedure of the interpolation section 106b will be described step by step with reference to FIG. 14.

Step S51: among eight pixels V22, V32, V42, V23, V43, V24, V34 and V44 adjoining the pixel of interest (i.e., the eight pixels of FIG. 8C), the number of pixels which have a directionality different from the directionality of the pixel of interest, is counted.

Step S52: it is determined whether or not the number of pixels detected in step S51 is larger than or equal to a threshold E which is stored in a register (not shown).

When the number of pixels detected in step S51 is larger than or equal to the threshold E, the procedure goes to step S53.

When the number of pixels detected in step S51 is not larger than or equal to the threshold E, the procedure is ended.

Step S53: for each of the right-inclined directionality, the horizontal directionality, the left-inclined directionality, the vertical directionality, and no directionality, the number of adjoining pixels having the same directionality is counted. A directionality having the largest count is detected along with the count.

Step S54: it is determined whether or not the count detected in step S53 is larger than or equal to a threshold F stored in a register (not shown).

When the count detected in step S53 is larger than or equal to the threshold F, the procedure goes to step S55.

When the count detected in step S53 is not larger than or equal to the threshold F, the procedure is ended.

Finally, the directionality of the pixel of interest is corrected to the directionality detected in step S53.

The thresholds E and F are each in the range of 1 to 8. Actually, the threshold E is preferably about 6 and the threshold F is preferably about 4 according to the results of an actual experiment.

As described above, according to Example 3, directionality can be detected with a higher level of accuracy, thereby making it possible to obtain a higher-quality image.

EXAMPLE 4

Hereinafter, Example 4 of the present invention will be described with reference to the accompanying drawings.

Figure 17:
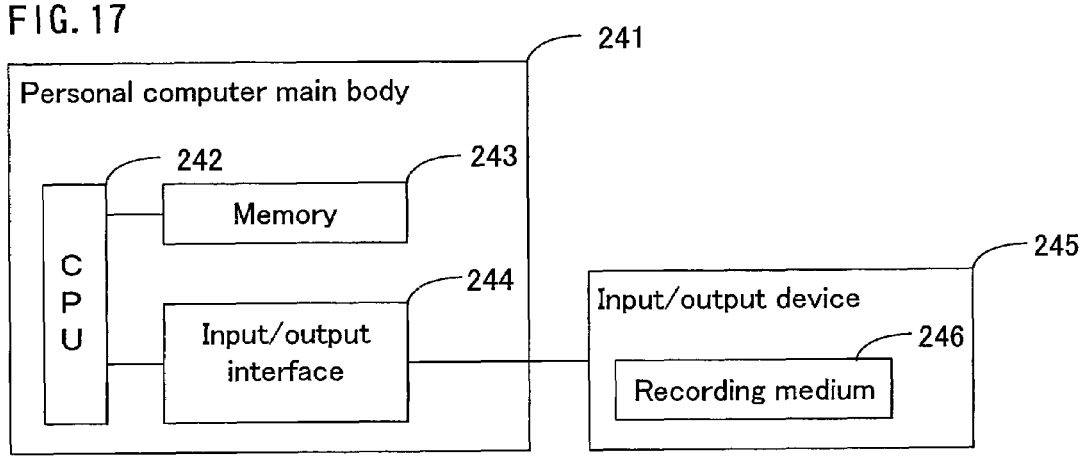
FIG. 17 shows a structure of a data processing apparatus according to an example of the present invention.

FIG. 17 shows a structure of a data processing apparatus 200.

The data processing apparatus 200 includes a personal computer main body 241 and an input/output device 245.

The personal computer main body 241 includes a CPU 242, a memory 243, and an input/output interface 244. The input/output device 245 includes a recording medium 246.

The CPU 242 controls the input/output device 245 via the input/output interface 244, receives an image processing program, a parameter file and Bayer data from the recording medium 246, and stores them into the memory 243.

The CPU 242 reads the image processing program, the parameter file and the Bayer data from the memory 243, and processes the input Bayer data in accordance with procedures equivalent to those described with reference to FIGS. 3, 6, 9, 11, 13 and 14. The input/output device 245 is controlled via the input/output interface 244 to output an image-processed image data to the recording medium 246.

According to Example 4, image processing including procedures equivalent to those described with reference to FIGS. 3, 6, 9, 11, 13 and 14 can be performed on a personal computer. Specifically, only Bayer data is output by an imaging device (not shown), and image processing is performed by a personal computer, thereby making it possible to cause the imaging device to capture images with high speed. Further, the personal computer can perform image processing a plurality of times while changing thresholds, thereby making it possible to easily obtain images having desired quality.

According to the present invention, a direction of an edge in the vicinity of a pixel of interest is detected based on a first color signal indicating a color component of a pixel of interest and a second color signal indicating color components of a plurality of neighbor pixels. The color components of the neighbor pixels include at least three color components. Therefore, as compared to when a direction of an edge in the vicinity of a pixel of interest is detected based on the first color signal and a color signal indicating two or less of the color components of the neighbor pixels, the direction of the edge in the vicinity of the pixel of interest can be detected based on a color signal indicating a larger number of color components. As a result, a direction of an edge in the vicinity of a pixel of interest can be detected with higher accuracy.

According to the present invention, it is possible to provide an image processing apparatus, an image processing method and an image processing program which can detect and store an edge of an object using interpolation with high accuracy, and a recording medium storing the image processing program.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. An image processing apparatus, comprising:
processor; and
a computer readable medium storing algorithms operable to cause the processor to perform:
a first color signal detection for detecting a first color signal indicating a color component of a pixel of interest from the pixel of interest;

a second color signal detection for detecting a plurality of second color signals indicating color components of a plurality of neighbor pixels located in a vicinity of the pixel of interest from the plurality of neighbor pixels;

a direction detection for detecting a direction of an edge in the vicinity of the pixel of interest based on the first color signal and the plurality of second color signals, a directionality data detection for detecting directionality data based on the first color signal and the plurality of second color signals; and a directionality data direction detection for detecting at least one edge direction among a plurality of edge directions, depending on a size of a value indicated by the directionality data, wherein the color components of the plurality of neighbor pixels include color components of at least three different colors, and the plurality of second color signals includes signals indicative of color components of at least three different colors, and wherein the directionality data indicates a value corresponding to a degree of a similarity between a designated edge direction among the plurality of edge directions and a predetermined edge direction in the vicinity of the pixel of interest.

2. An image processing apparatus according to claim 1, wherein the image processing apparatus further includes:

a directionality storage section for storing data indicating a direction of an edge in the vicinity of the pixel of interest, wherein the directionality data direction detection further includes an adjoining pixel directionality reference for referencing an edge direction of a pixel adjoining the pixel of interest.

3. An image processing apparatus according to claim 1, wherein the directionality data direction detection further includes:

detecting an edge direction of a pixel adjoining the pixel of interest, and referencing a detected edge direction of an adjoining pixel.

4. An image processing apparatus, comprising:

a processor; and a computer readable medium storing algorithms operable to cause the processor to perform:

a first color signal detection for detecting a first color signal indicating a color component of a pixel of interest from the pixel of interest;

a second color signal detection for detecting a plurality of second color signals indicating color components of a plurality of neighbor pixels located in a vicinity of the pixel of interest from the plurality of neighbor pixels;

a direction detection for determining whether or not there is an edge in the vicinity of the pixel of interest, and for detecting at least one edge direction in the vicinity of the pixel of interest based on the first color signal and the plurality of second color signals, and a plurality of interpolation filters for interpolating data indicating a plurality of edge directions, wherein, when it is determined that there is an edge in the vicinity of the pixel of interest, at least one of the plurality of interpolation filters interpolates the data indicating the detected edge direction in the vicinity of the pixel of interest, and wherein the color components of the plurality of neighbor pixels include color components of at least three different colors, and the plurality of second color signals includes signals indicative of color components of at least three different colors.

5. An image processing apparatus, comprising:

a processor; and a computer readable medium storing algorithms operable to cause the processor to perform;

a first color signal detection for detecting a first color signal indicating a color component of a pixel of interest from the pixel of interest;

a second color signal detection for detecting a plurality of second color signals indicating color components of a plurality of neighbor pixels located in a vicinity of the pixel of interest from the plurality of neighbor pixels;

a direction detection for determining whether or not there is an edge in the vicinity of the pixel of interest, and for detecting at least one edge direction in the vicinity of the pixel of interest based on the first color signal and the plurality of second color signals, a plurality of interpolation filters for interpolating data indicating a plurality of edge directions, wherein, when it is determined that there is not an edge in the vicinity of the pixel of interest, at least one of the plurality of interpolation filters interpolates data when there is not an edge in the vicinity of the pixel of interest, and wherein the color components of the plurality of neighbor pixels include color components of at least three different colors, and the plurality of second color signals includes signals indicative of color components of at least three different colors.

6. An image processing apparatus, comprising:

a processor; and a computer readable medium storing algorithms operable to cause the processor to perform:

a first color signal detection for detecting a first color signal indicating a color component of a pixel of interest from the pixel of interest;

a second color signal detection for detecting a plurality of second color signals indicating color components of a plurality of neighbor pixels located in a vicinity of the pixel of interest from the plurality of neighbor pixels;

a direction detection for detecting a direction of an edge in the vicinity of the pixel of interest based on the first color signal and the plurality of second color signals, wherein the color components of the plurality of neighbor pixels include color components of at least three different colors, and the plurality of second color signals includes signals indicative of color components of at least three different colors, and wherein the direction detection includes: detecting edge directions of a plurality of pixels contained in a designated region; and an image processing section for interpolating the plurality of pixels based on data indicating the edge directions of the plurality of pixels.

7. An image processing apparatus according to claim 6, wherein the direction detection further includes: a directionality correction for correcting the edge direction of each of the plurality of pixels based on the edge direction of the pixel of interest and the edge directions of the neighbor pixels.

8. An image processing method, comprising the steps of:

providing a processor; and providing a computer readable medium storing algorithms operable to cause the processor to:

detect a first color signal indicating a color component of a pixel of interest from the pixel of interest;

detect a plurality of second color signals indicating color components of a plurality of neighbor pixels located in a vicinity of the pixel of interest from the plurality of neighbor pixels; and detect as directionality data based on the first color signal and the plurality of second color signals a direction of at least one edge among a plurality of edge directions in the vicinity of the pixel of interest depending on a size of a value indicated by the directionality data, wherein the color components of the plurality of neighbor pixels include color components of at least three different colors, and the plurality of second color signals include signals indicative of color components of at least three different colors, and wherein the directionality data indicates a value corresponding to a degree of a similarity between a designated edge direction among the plurality of edge directions and a predetermined edge direction in the vicinity of the pixel of interest.

9. An image processing method according to claim 8, wherein the image processing method further includes:

storing data indicating a direction of an edge in the vicinity of the pixel of interest, wherein detecting the at least one edge direction further includes referencing an edge direction of a pixel adjoining the pixel of interest.

10. An image processing method according to claim 8, wherein detecting the at least one edge direction further includes:

detecting an edge direction of a pixel adjoining the pixel of interest; and referencing the detected edge direction of the adjoining pixel.

11. An image processing method, comprising the steps of providing a processor: and;

providing computer readable medium storing algorithms operable to cause the processor to:

detect a first color signal indicating a color component of a pixel of interest from the pixel of interest;

detect a plurality of second color signals indicating color components of a plurality of neighbor pixels located in a vicinity of the pixel of interest from the plurality of neighbor pixels;

detect as directionality data based on the first color signal and the plurality of second color signals a direction of at least one edge among a plurality of edge directions in the vicinity of the pixel of interest, determine whether or not there is an edge in the vicinity of the pixel of interest based on data indicative of the direction of the edge in the vicinity of the pixel of interest, and interpolate data indicating the plurality of edge directions, wherein, when it is determined that there is an edge in the vicinity of the pixel of interest, the data is interpolated so as to indicate the detected edge direction in the vicinity of the pixel of interest, and wherein the color components of the plurality of neighbor pixels include color components of at least three different colors, and the plurality of second color signals include signals indicative of color components of at least three different colors.

12. An image processing method, comprising the steps of: providing a processor: and providing computer readable medium storing algorithms operable to cause the processor to;

detect a first color signal indicating a color component of a pixel of interest from the pixel of interest;

detect a plurality of second color signals indicating color components of a plurality of neighbor pixels located in a vicinity of the pixel of interest from the plurality of neighbor pixels;

detect as directionality data based on the first color signal and the plurality of second color signals a direction of at least one edge among a plurality of edge directions in the vicinity of the pixel of interest, determine whether or not there is an edge in the vicinity of the pixel of interest based on data indicative of the direction of the edge in the vicinity of the pixel of interest, and interpolate data when there is not an edge in the vicinity of the pixel of interest, wherein, when it is determined that there is not an edge in the vicinity of the pixel of interest, the data is interpolated so as to indicate that there is not an edge in the vicinity of the pixel of interest, and wherein the color components of the plurality of neighbor pixels include color components of at least three different colors, and the plurality of second color signals include signals indicative of color components of at least three different colors.

13. An image processing method, comprising the steps of providing a processor, and providing a computer readable medium storing algorithms operable to cause the processor to:

detect a first color signal indicating a color component of a pixel of interest from the pixel of interest;

detect a plurality of second color signals indicating color components of a plurality of neighbor pixels located in a vicinity of the pixel of interest from the plurality of neighbor pixels; and detect as directionality data based on the first color signal and the plurality of second color signals a direction of at least one edge among a plurality of edge directions in the vicinity of the pixel of interest depending on a size of a value indicated by the directionality data, wherein the color components of the plurality of neighbor pixels include color components of at least three different colors, and the plurality of second color signals include signals indicative of color components of at least three different colors, and wherein the detection of the direction of the edge in the vicinity of the pixel of interest includes:

detecting edge directions of a plurality of pixels contained in a designate region; and interpolating the plurality of pixels based on data indicative of the edge directions of the plurality of pixels.

14. An image processing method according to claim 13, wherein detecting the direction of the edge in the vicinity of the pixel of interest further includes:

correcting the edge directions of the plurality of pixels based on the edge direction of the pixel of interest and the edge directions of the neighbor pixels.

\* \* \* \* \*